(12) United States Patent
Park et al.

(10) Patent No.: US 11,509,900 B2
(45) Date of Patent: Nov. 22, 2022

(54) VIDEO DECODING METHOD AND APPARATUS, AND VIDEO ENCODING METHOD AND APPARATUS

(71) Applicant: SAMSUNG ELECTRONICS CO., LTD., Suwon-si (KR)

(72) Inventors: Minsoo Park, Suwon-si (KR); Gahyun Ryu, Suwon-si (KR); Minwoo Park, Suwon-si (KR); Seungsoo Jeong, Suwon-si (KR); Kiho Choi, Suwon-si (KR); Narae Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/184,009

(22) Filed: Feb. 24, 2021

(65) Prior Publication Data
US 2021/0274184 A1 Sep. 2, 2021

Related U.S. Application Data

(63) Continuation of application No. PCT/KR2019/010808, filed on Aug. 23, 2019.
(Continued)

(51) Int. Cl.
*H04N 19/96* (2014.01)
*H04N 19/132* (2014.01)
(Continued)

(52) U.S. Cl.
CPC ......... *H04N 19/132* (2014.11); *H04N 19/159* (2014.11); *H04N 19/176* (2014.11); *H04N 19/186* (2014.11); *H04N 19/96* (2014.11)

(58) Field of Classification Search
None
See application file for complete search history.

(56) References Cited

U.S. PATENT DOCUMENTS 9,906,789 B2 * 2/2018 Yang ............... H04N 19/176
10,687,058 B2 6/2020 Chuang et al.
(Continued)

FOREIGN PATENT DOCUMENTS

KR 10-2016-0009109 A 1/2016
KR 10-2017-0120188 A 10/2017
(Continued)

OTHER PUBLICATIONS

Communication dated Dec. 2, 2019 issued by the International Searching Authority in counterpart Application No. PCT/KR2019/010808 (PCT/ISA/220, PCT/ISA/210, and PCT/ISA/237).
(Continued)

*Primary Examiner* — Mohammad J Rahman
(74) *Attorney, Agent, or Firm* — Sughrue Mion, PLLC

(57) ABSTRACT

Provided are a method and apparatus, which, during video encoding and decoding processes, obtain chroma intra prediction mode information about a current chroma block, when the chroma intra prediction mode information indicates a direct mode (DM), determine a luma block including a luma sample corresponding to a chroma sample at a lower-right location with respect to a center of the current chroma block, determine a chroma intra prediction mode of the current chroma block based on an intra prediction mode of the determined luma block, and perform intra prediction on the current chroma block, based on the determined chroma intra prediction mode.

1 Claim, 27 Drawing Sheets

Related U.S. Application Data

(60) Provisional application No. 62/722,592, filed on Aug. 24, 2018.

(51) Int. Cl.
*H04N 19/159* (2014.01)
*H04N 19/176* (2014.01)
*H04N 19/186* (2014.01)

(56) References Cited

U.S. PATENT DOCUMENTS

| | | | |
|---|---|---|---|
| 2006/0210185 A1* | 9/2006 | Sun | H04N 19/117 |
| | | | 382/240 |
| 2014/0286413 A1* | 9/2014 | Joshi | H04N 19/593 |
| | | | 375/240.12 |
| 2014/0355667 A1* | 12/2014 | Lei | H04N 19/167 |
| | | | 375/240.02 |
| 2015/0172716 A1* | 6/2015 | Chen | H04N 19/196 |
| | | | 375/240.02 |
| 2015/0296211 A1* | 10/2015 | Chuang | H04N 19/176 |
| | | | 375/240.12 |
| 2016/0337651 A1* | 11/2016 | Alshina | H04N 19/70 |
| 2017/0244964 A1* | 8/2017 | Liu | H04N 19/46 |
| 2017/0272748 A1 | 9/2017 | Seregin et al. | |
| 2017/0310962 A1* | 10/2017 | Yang | H04N 19/44 |
| 2018/0048889 A1 | 2/2018 | Zhang et al. | |
| 2018/0213264 A1* | 7/2018 | Zhang | H04N 19/96 |
| 2019/0019323 A1* | 1/2019 | Fielding | G09G 5/393 |
| 2019/0215512 A1 | 7/2019 | Lee et al. | |
| 2019/0281285 A1* | 9/2019 | Piao | H04N 19/129 |
| 2020/0045322 A1* | 2/2020 | Ye | H04N 19/593 |
| 2020/0396484 A1 | 12/2020 | Jeon et al. | |
| 2021/0092395 A1* | 3/2021 | Zhang | H04N 19/105 |
| 2021/0218992 A1 | 7/2021 | Jeon et al. | |
| 2021/0227231 A1* | 7/2021 | Hannuksela | H04N 21/8456 |

FOREIGN PATENT DOCUMENTS

| | | |
|---|---|---|
| KR | 10-2018-0033302 A | 4/2018 |
| KR | 10-2018-0037575 A | 4/2018 |
| KR | 10-2018-0075422 A | 7/2018 |
| WO | 2018/064948 A1 | 4/2018 |
| WO | 2019/216710 A1 | 11/2019 |
| WO | 2019/216718 A1 | 11/2019 |

OTHER PUBLICATIONS

Communication dated May 28, 2021 issued by the Korean Intellectual Property Office in counterpart Korean Application No. 10-2021-7003674.

Narae Choi et al., "CE3-related: Chroma DM modification", Joint Video Experts Team (JVET) of ITU-T SG 16 WP 3 and ISO/IEC JTC 1/SC 29/WG11, Document: JVET-L0053-v2, 2018, 5 pages total, XP030194379.

Li Zhang et al., "CE3-related: Modified chroma derived mode", Joint Video Experts Team (JVET) of ITU-T SG 16 WP 3 and ISO/IEC JTC 1/SC 29/WG 11, Document: JVET-L0272-vl, 2018, 3 pages total, XP030193809.

Communication dated May 2, 2022 issued by the European Patent Office in counterpart European Application No. 19852259.1.

* cited by examiner

FIG. 13

| BLOCK SHAPE<br>DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

VIDEO DECODING METHOD AND APPARATUS, AND VIDEO ENCODING METHOD AND APPARATUS

TECHNICAL FIELD

The disclosure relates to a video decoding method and a video decoding apparatus, and more particularly, to a video encoding method and apparatus and a video decoding method and apparatus, in which chroma prediction is performed on a current chroma block by using a prediction mode of a luma block including a luma sample corresponding to a chroma sample at a lower-right location with respect to a center of the current chroma block.

BACKGROUND ART

Image data is encoded by a codec according to a preset data compression standard, e.g., the Moving Picture Expert Group (MPEG) standard, and then stored in a recording medium or transmitted in the form of a bitstream through a communication channel.

With the development and spread of hardware capable of reproducing and storing high-resolution or high-definition image content, the need for a codec that effectively encodes or decodes high-resolution or high-definition image content has increased. Encoded image content may be decoded and then reproduced. Recently, methods of effectively compressing such high-resolution or high-definition image content are used. For example, a method of randomly splitting an image to be encoded or a procedure of rendering data has been proposed to allow an image compression technique to be effectively implemented.

As one of techniques for rendering data, when a chroma prediction mode is a direct mode (DM), it is common to use a prediction mode of one luma block corresponding to one chroma block.

DESCRIPTION OF EMBODIMENTS

Technical Problem

Provided are a method and an apparatus, which, during video encoding and decoding processes, determine a luma block including a luma sample corresponding to a chroma sample at a lower-right location with respect to a center of a current chroma block, determine a chroma intra prediction mode of the current chroma block based on an intra prediction mode of the determined luma block, and perform intra prediction on the current chroma block, based on the determined chroma intra prediction mode.

Solution to Problem

To solve the technical problem, according to the disclosure, a video decoding method includes: obtaining chroma intra prediction mode information about a current chroma block; when the chroma intra prediction mode information indicates a direct mode (DM), determining a luma block including a luma sample corresponding to a chroma sample at a lower-right location with respect to a center of the current chroma block; based on an intra prediction mode of the determined luma block, determining a chroma intra prediction mode of the current chroma block; and based on the determined chroma intra prediction mode, performing intra prediction on the current chroma block.

To solve the technical problem, according to the disclosure, a video decoding apparatus includes: a memory; and at least one processor connected to the memory, wherein the at least one processor is configured to: obtain chroma intra prediction mode information about a current chroma block; when the chroma intra prediction mode information indicates a DM, determine a luma block including a luma sample corresponding to a chroma sample at a lower-right location with respect to a center of the current chroma block; based on an intra prediction mode of the determined luma block, determine a chroma intra prediction mode of the current chroma block; and based on the determined chroma intra prediction mode, perform intra prediction on the current chroma block.

To solve the technical problem, according to the disclosure, a video encoding method includes: determining a luma block including a luma sample corresponding to a chroma sample at a lower-right location with respect to a center of a current chroma block; based on an intra prediction mode of the determined luma block, determining a chroma intra prediction mode of the current chroma block; based on the determined chroma intra prediction mode, performing intra prediction on the current chroma block; and generating chroma intra prediction mode information about the current chroma block.

To solve the technical problem, according to the disclosure, a video encoding apparatus includes at least one processor connected to a memory, wherein the at least one processor is configured to: determine a luma block including a luma sample corresponding to a chroma sample at a lower-right location with respect to a center of a current chroma block; based on an intra prediction mode of the determined luma block, determine a chroma intra prediction mode of the current chroma block; based on the determined chroma intra prediction mode, perform intra prediction on the current chroma block; and generate chroma intra prediction mode information about the current chroma block.

Advantageous Effects of Disclosure

During video encoding and decoding processes, chroma intra prediction mode information about a current chroma block is obtained, when the chroma intra prediction mode information indicates a direct mode (DM), a luma block including a luma sample corresponding to a chroma sample at a lower-right location with respect to a center of the current chroma block is determined, a chroma intra prediction mode of the current chroma block is determined based on an intra prediction mode of the determined luma block, and intra prediction is performed on the current chroma block, based on the determined chroma intra prediction mode. Therefore, coding efficiency may be improved.

BRIEF DESCRIPTION OF DRAWINGS

FIG. 13 illustrates a process of determining a depth of a coding unit as a shape and size of the coding unit change, when the coding unit is recursively split such that a plurality of coding units are determined, according to an embodiment.

BEST MODE

Figure 1:
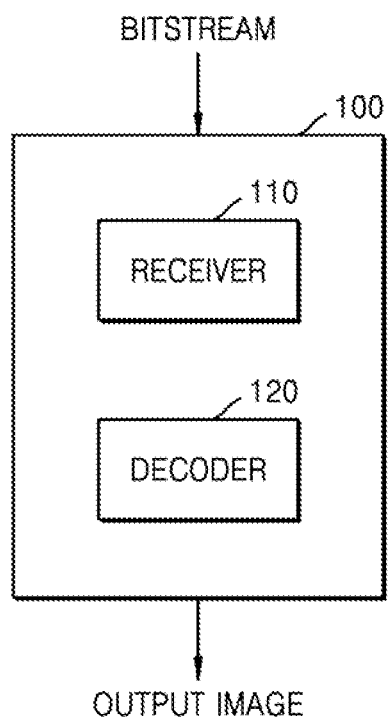
FIG. 1 illustrates a schematic block diagram of an image decoding apparatus according to an embodiment.

According to an embodiment of the disclosure, a video decoding method includes: obtaining chroma intra prediction mode information about a current chroma block; when the chroma intra prediction mode information indicates a direct mode (DM), determining a luma block including a luma sample corresponding to a chroma sample at a lower-right location with respect to a center of the current chroma block; based on an intra prediction mode of the determined luma block, determining a chroma intra prediction mode of the current chroma block; and based on the determined chroma intra prediction mode, performing intra prediction on the current chroma block.

The chroma sample at the lower-right location with respect to the center of the current chroma block may be a chroma sample which is located in the right side by ½ of a width of the current chroma block and located at the lower side by ½ of a height of the current chroma block, from a chroma sample at an upper-left location of the current chroma block.

The chroma intra prediction mode information may indicate one of prediction modes including a planar mode, a direct current (DC) mode, a vertical mode, a horizontal mode, or a DM.

The current chroma block and the determined luma block may be split into different tree structures.

A luma region corresponding to the current chroma block may include a plurality of luma blocks.

According to an embodiment of the disclosure, a video encoding method includes: from among N luma blocks corresponding to a current chroma block, determining a luma block including a luma sample corresponding to a chroma sample at a lower-right location with respect to a center of the current chroma block; based on an intra prediction mode of the determined luma block, determining a chroma intra prediction mode of the current chroma block; based on the determined chroma intra prediction mode, performing intra prediction on the current chroma block; and generating chroma intra prediction mode information about the current chroma block.

The chroma sample at the lower-right location with respect to the center of the current chroma block may be a chroma sample which is located in the right side by ½ of a width of the current chroma block and located at the lower side by ½ of a height of the current chroma block, from a chroma sample at an upper-left location of the current chroma block.

The chroma intra prediction mode information may include one of prediction modes including a planar mode, a direct current (DC) mode, a vertical mode, a horizontal mode, or a direct mode (DM).

The current chroma block and the determined luma block may be split into different tree structures.

A luma region corresponding to the current chroma block may include a plurality of luma blocks.

According to an embodiment of the disclosure, a video decoding apparatus includes: a memory; and at least one processor connected to the memory, wherein the at least one processor is configured to: obtain chroma intra prediction mode information about a current chroma block; when the chroma intra prediction mode information indicates a direct current (DM), determine a luma block including a luma sample corresponding to a chroma sample at a lower-right location with respect to a center of the current chroma block; based on an intra prediction mode of the determined luma block, determine a chroma intra prediction mode of the current chroma block; and based on the determined chroma intra prediction mode, perform intra prediction on the current chroma block.

The chroma sample at the lower-right location with respect to the center of the current chroma block may be a chroma sample which is located in the right side by ½ of a width of the current chroma block and located at the lower side by ½ of a height of the current chroma block, from a chroma sample at an upper-left location of the current chroma block.

The chroma intra prediction mode information may include one of prediction modes including a planar mode, a direct current (DC) mode, a vertical mode, a horizontal mode, or a direct mode (DM).

The current chroma block and the determined luma block may be split into different tree structures.

A luma region corresponding to the current chroma block may include a plurality of luma blocks.

MODE OF DISCLOSURE

The advantages and features of the disclosure and methods of achieving the advantages and features will be described more fully with reference to the accompanying drawings, in which embodiments of the disclosure are shown. The disclosure may, however, be embodied in many different forms and should not be construed as being limited to the embodiments set forth herein; rather these embodiments are provided so that the disclosure will be thorough and complete, and will fully convey the concept of the disclosure to one of ordinary skill in the art.

The terms used herein will be briefly described, and disclosed embodiments will be described in detail.

The terms used herein are those general terms currently widely used in the art in consideration of functions in the disclosure, but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

It is to be understood that the singular forms "a," "an," and "the" include plural referents unless the context clearly dictates otherwise.

It will be understood that when a certain part "includes" a certain component, the part does not exclude another component but may further include another component, unless the context clearly dictates otherwise.

Also, the term "unit" used herein refers to a software component or a hardware component, which performs certain tasks. However, the term "unit" is not limited to software or hardware. A "unit" may be configured to be in an addressable storage medium or configured to operate one or more processors. Thus, a "unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided by the components and "units" may be combined into fewer components and "units" or further separated into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, etc. In some circumstances, the "processor" may refer to an application specific semiconductor (ASIC), a programmable logic device (PLD), a field programmable gate array (FPGA), etc. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, etc. When the processor can read information from a memory and/or write information to the memory, the memory is said to be in an electronic communication state with the processor. The memory integrated in the processor is in an electronic communication state with the processor.

Hereinafter, an "image" may indicate a still image of a video or may indicate a dynamic image such as a moving image, that is, the video itself.

Hereinafter, a "sample" denotes data assigned to a sampling location of an image, i.e., data to be processed. For example, pixel values of an image in a spatial domain and transform coefficients on a transform region may be samples. A unit including at least one such sample may be defined as a block.

Also, in the present specification, a "current block" may denote a block of a largest coding unit, a coding unit, a prediction unit, or a transform unit of a current image to be encoded or decoded.

The disclosure will now be described more fully with reference to the accompanying drawings for one of ordinary skill in the art to be able to perform the disclosure without any difficulty. Also, portions irrelevant to the descriptions of the disclosure will be omitted in the drawings for clear descriptions of the disclosure.

Hereinafter, an image encoding apparatus and an image decoding apparatus, and an image encoding method and an image decoding method according to embodiments will be described with reference to FIGS. 1 through 16. A method of determining a data unit of an image, according to an embodiment, will be described with reference to FIGS. 3 through 16. A video encoding/decoding method according to an embodiment, in which a luma block including a luma sample corresponding to a chroma sample at a lower-right location with respect to a center of a current chroma block is determined, a chroma intra prediction mode of the current chroma block is determined based on an intra prediction mode of the determined luma block, and intra prediction is performed on the current chroma block, based on the determined chroma intra prediction mode, will be described below with reference to FIGS. 17 through 21. A video encoding/decoding method according to another embodiment, in which a chroma prediction mode of a chroma block is determined, will be described below with reference to FIGS. 22 and 23. A video encoding/decoding method in which a chroma sample is predicted by using luma samples will be described below with reference to FIG. 24. A method of splitting a luma block and a chroma block will be described below with reference to FIGS. 25 through 27. A method of processing a largest coding unit at a boundary of a picture will be described below with reference to FIGS. 28 and 29. A motion compensation method according to an embodiment will be described below with reference to FIG. 30. Sizes of a luma block and a chroma block according to color formats will be described below with reference to FIG. 31.

Hereinafter, a method and apparatus for adaptively selecting a context model, based on various shapes of coding units, according to an embodiment of the disclosure, will be described with reference to FIGS. 1 and 2.

FIG. 1 illustrates a schematic block diagram of an image decoding apparatus according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described below. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
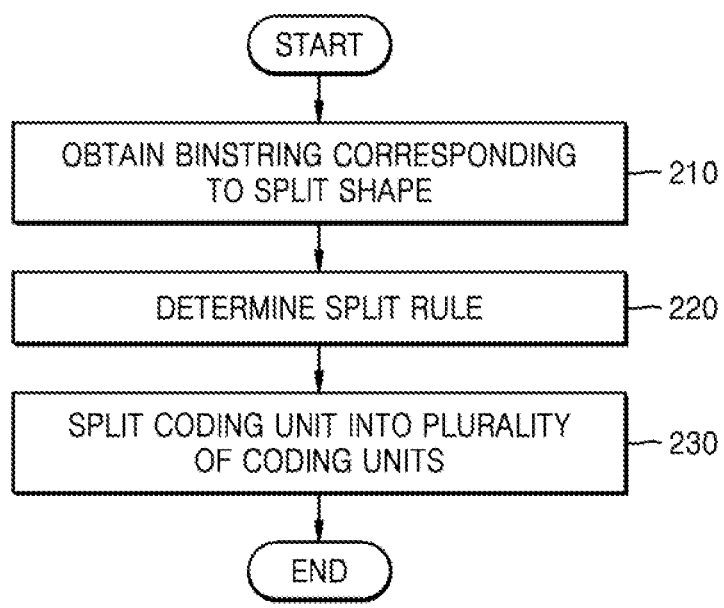
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of coding units (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 through 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
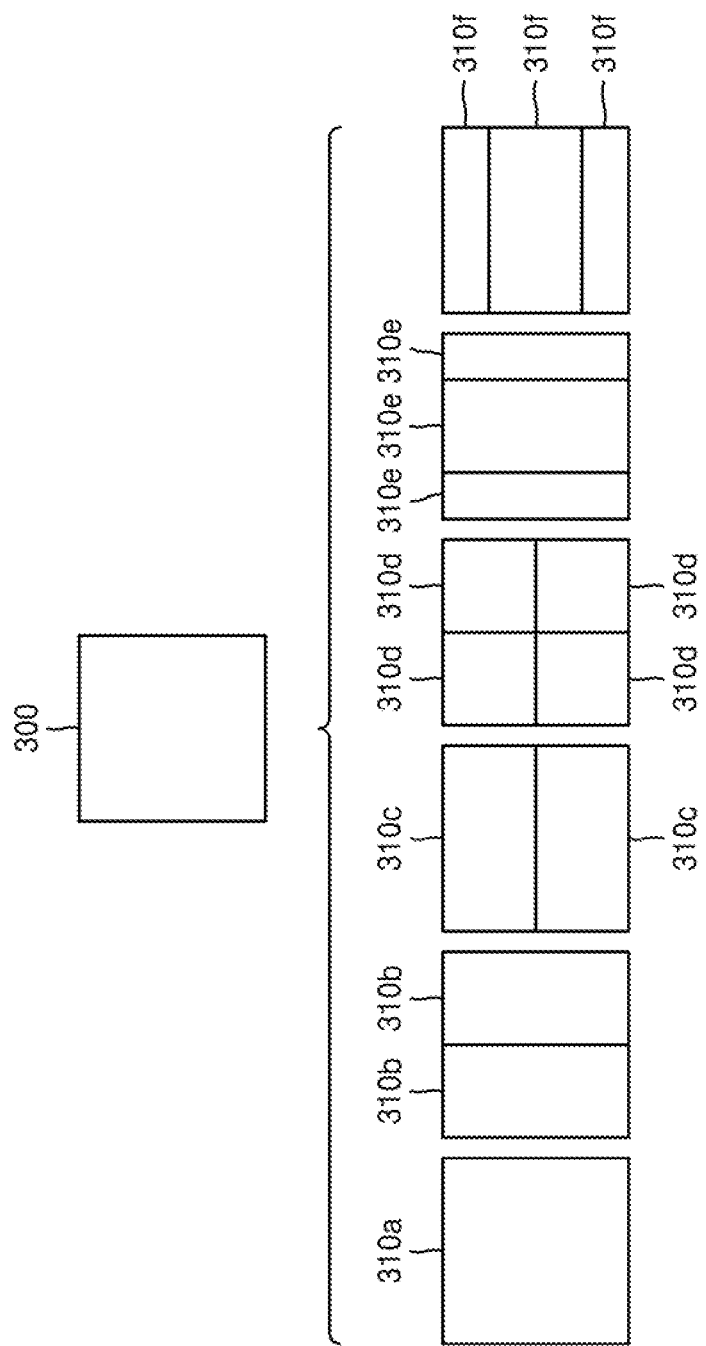
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the region of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

Figure 4:
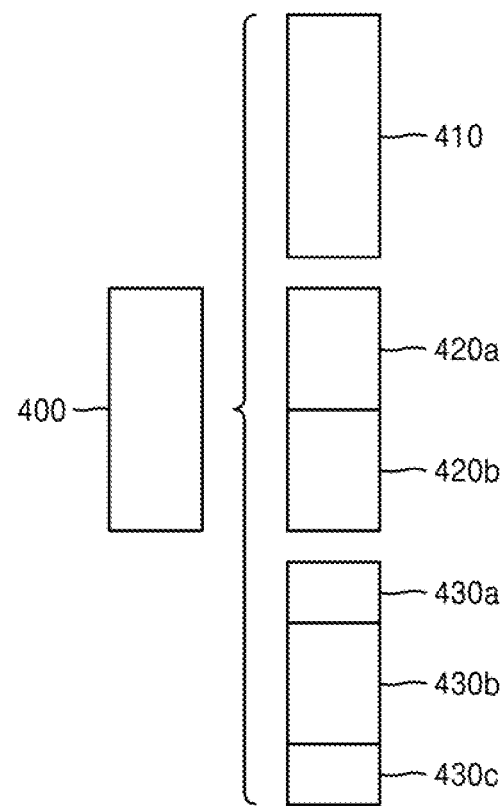
FIG. 4 illustrates a process, performed by an image decoding apparatus, of determining at least one coding unit by splitting a non-square coding unit, according to an embodiment.
Figure 4:
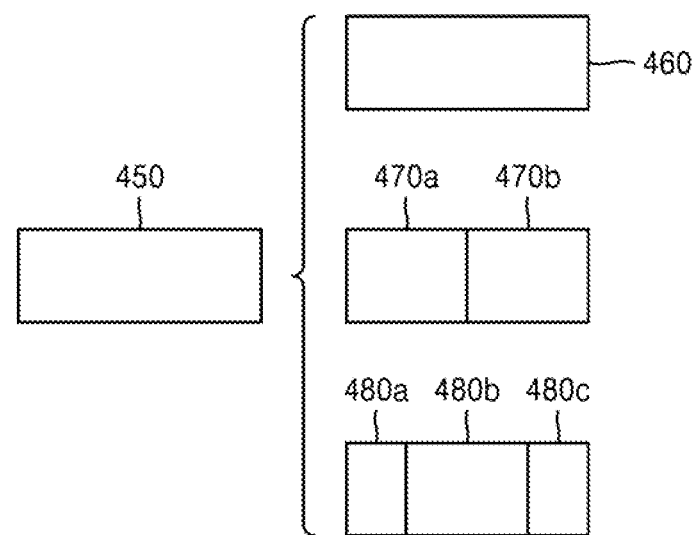

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420a and 420b, 430a to 430c, 470a and 470b, or 480a to 480c split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a preset number of times, unlike the other coding units 430a and 430c, or 480a and 480c.

Figure 5:
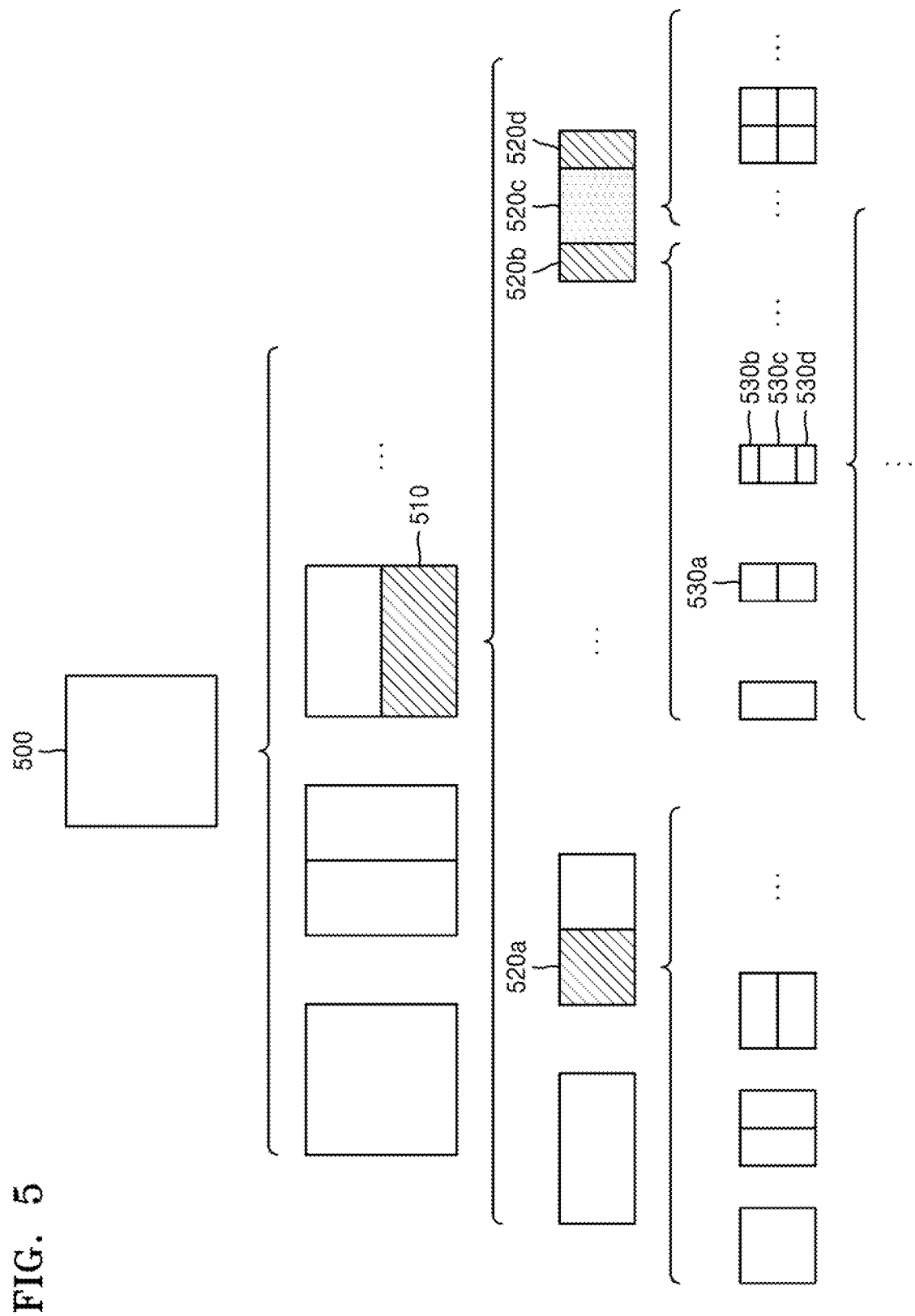
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, 520b, 520c, and 520d based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 510 may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
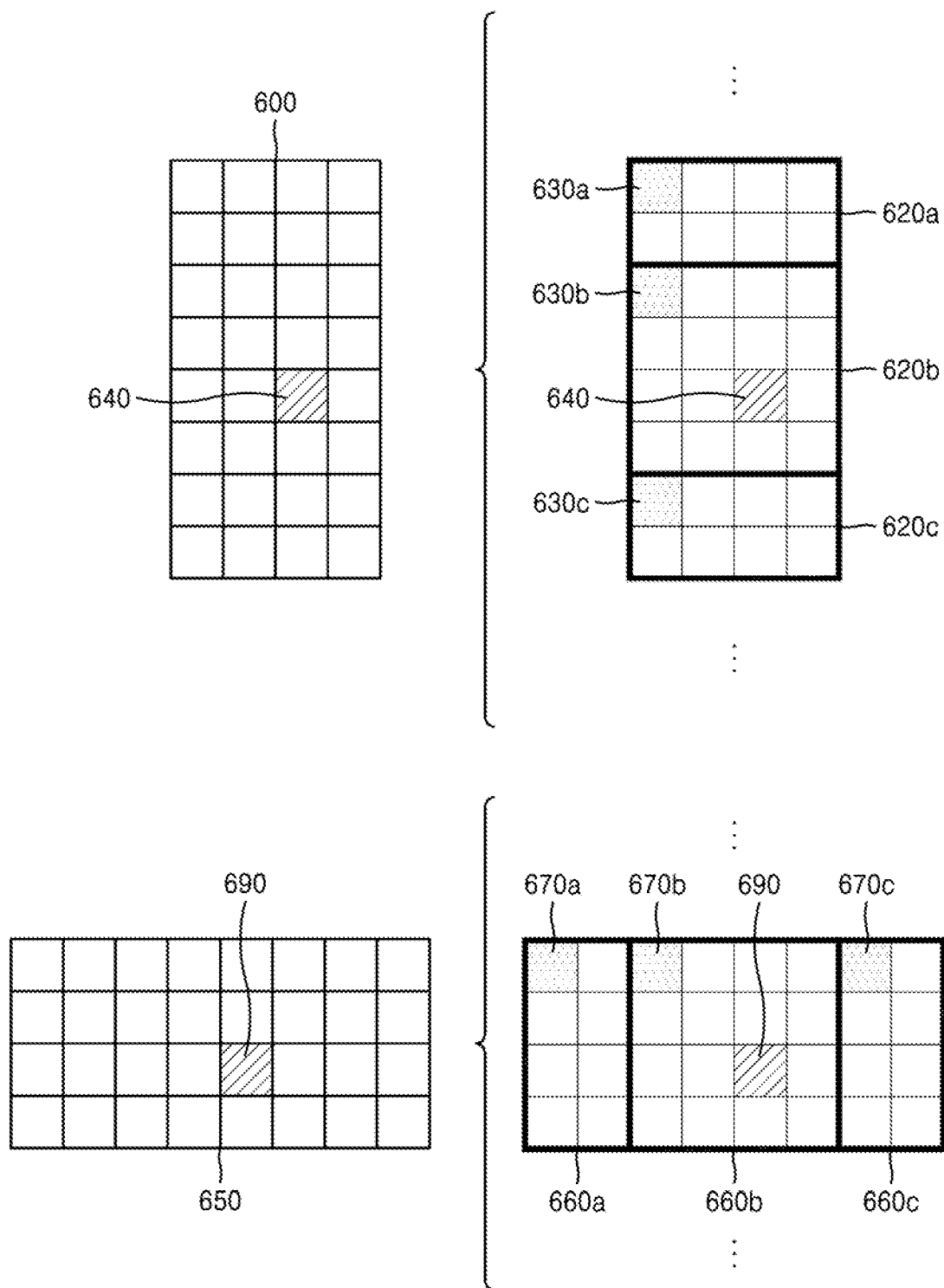
FIG. 6 illustrates a method, performed by an image decoding apparatus, of determining a preset coding unit from among an odd number of coding units, according to an embodiment.

FIG. 6 illustrates a method, performed by an image decoding apparatus, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper-left, lower-left, upper-right, lower-right locations, or the like). The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the middle coding unit 620b may include coordinates (xb, yb), and information indicating the location of the upper-left sample 630c of the lower coding unit 620c may include coordinates (xc, yc). The image decoding apparatus 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that is the information indicating the location of the upper-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660a, 660b, and 660c by using the coordinates (xd, yd) that is information indicating the location of an upper-left sample 670a of the left coding unit 660a, the coordinates (xe, ye) that is information indicating the location of an upper-left sample 670b of the middle coding unit 660b, and the coordinates (xf, yf) that is information indicating a location of the upper-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper-left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620a, 620b, and 620c determined by splitting the current coding unit 600 (e.g., a coding unit at a center location from among a plurality of split coding units). That is, the image decoding apparatus 100 may determine the sample at the preset location by considering a block shape of the current coding unit 600, determine the coding unit 620b including a sample, from which preset information (e.g., the split shape mode information) may be obtained, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center location of the current coding unit 600 as the sample from which the preset information may be obtained, and may put a preset restriction on the coding unit 620b including the sample 640, in a decoding operation. However, the location of the sample from which the preset information may be obtained is not limited to the above-described location, and may include arbitrary locations of samples included in the coding unit 620b to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information may be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
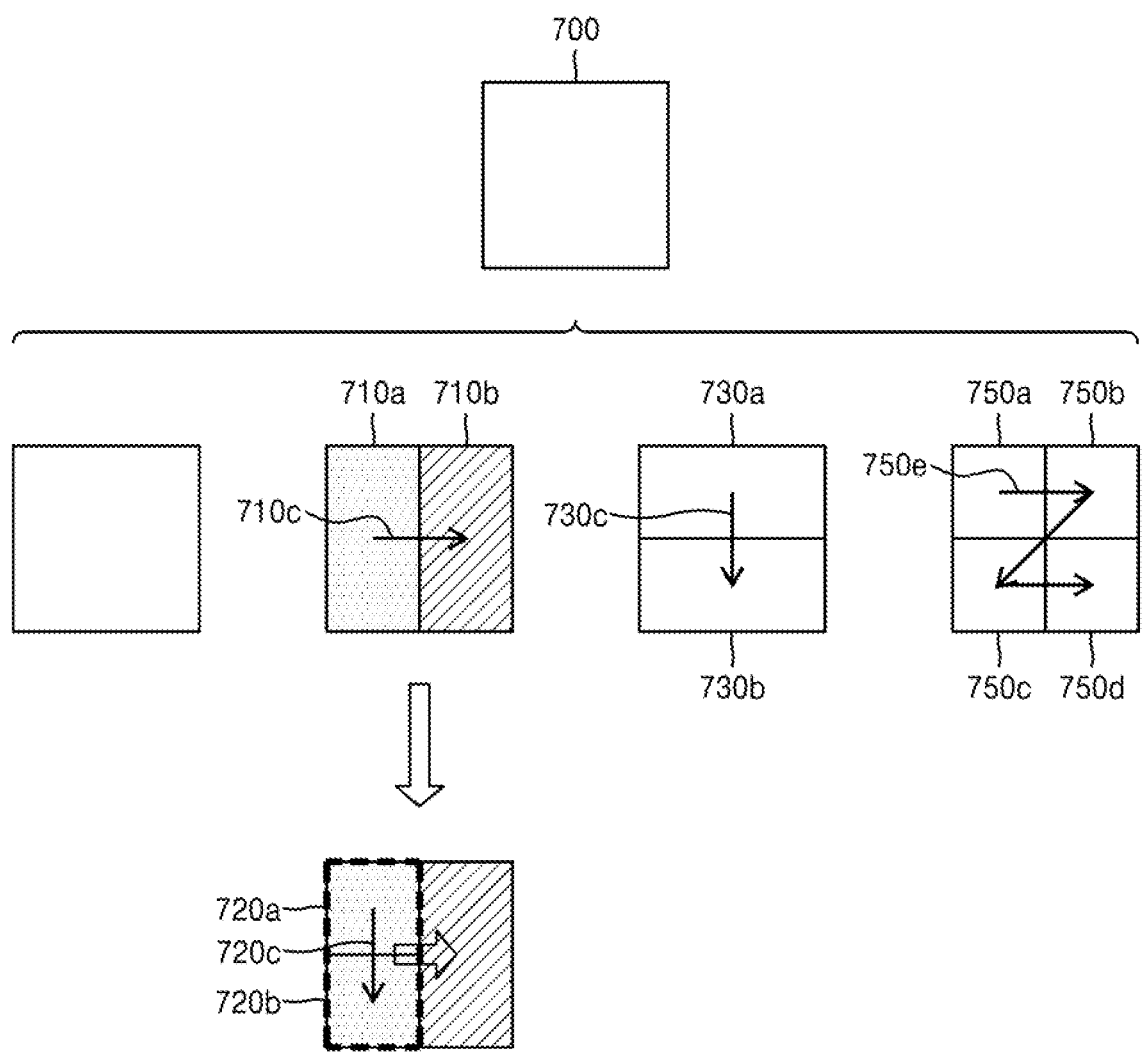
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine (to process?) the second coding units 750a to 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a, 710b, 730a, 730b, 750a, 750b, 750c, and 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
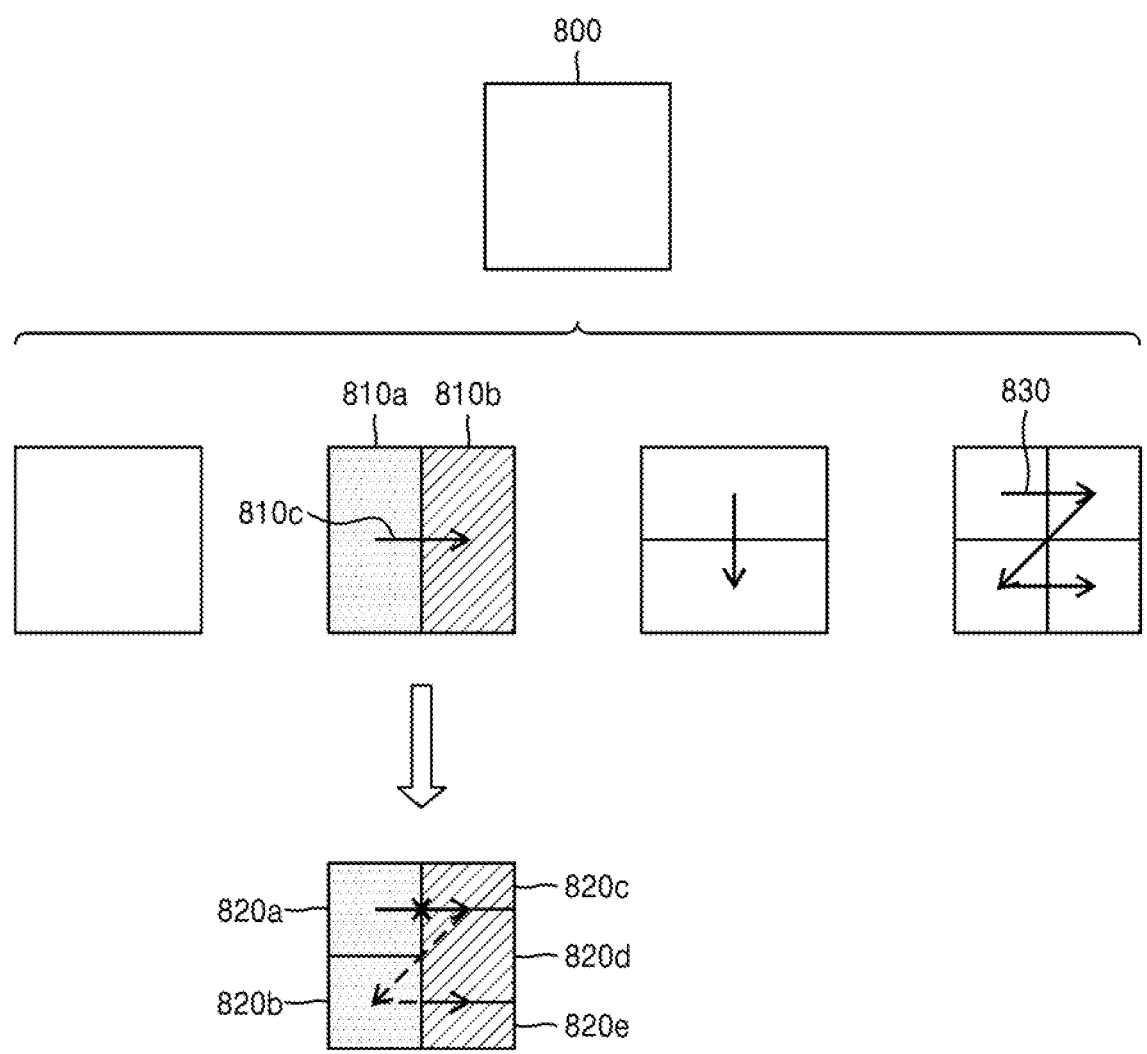
FIG. 8 illustrates a process, performed by an image decoding apparatus, of determining that a current coding unit is to be split into an odd number of coding units, when the coding units are not processable in a preset order, according to an embodiment.

FIG. 8 illustrates a process, performed by an image decoding apparatus, of determining that a current coding unit is to be split into an odd number of coding units, when the coding units are not processable in a preset order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the video decoding apparatus 100 may determine whether any coding unit is split into an odd number of coding units (OK?), by determining whether the third coding units 820a and 820b, and 820c to 820e are processable in a preset order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, or the third coding units 820a and 820b, and 820c to 820e are split into an odd number of coding units, based on at least one of the block shape information and the split shape mode information. For example, a coding unit located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c to 820e included in the first coding unit 800 satisfy the condition for processing in the preset order, and the condition relates to whether at least one of a width and height of the second coding units 810a and 810b is to be split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
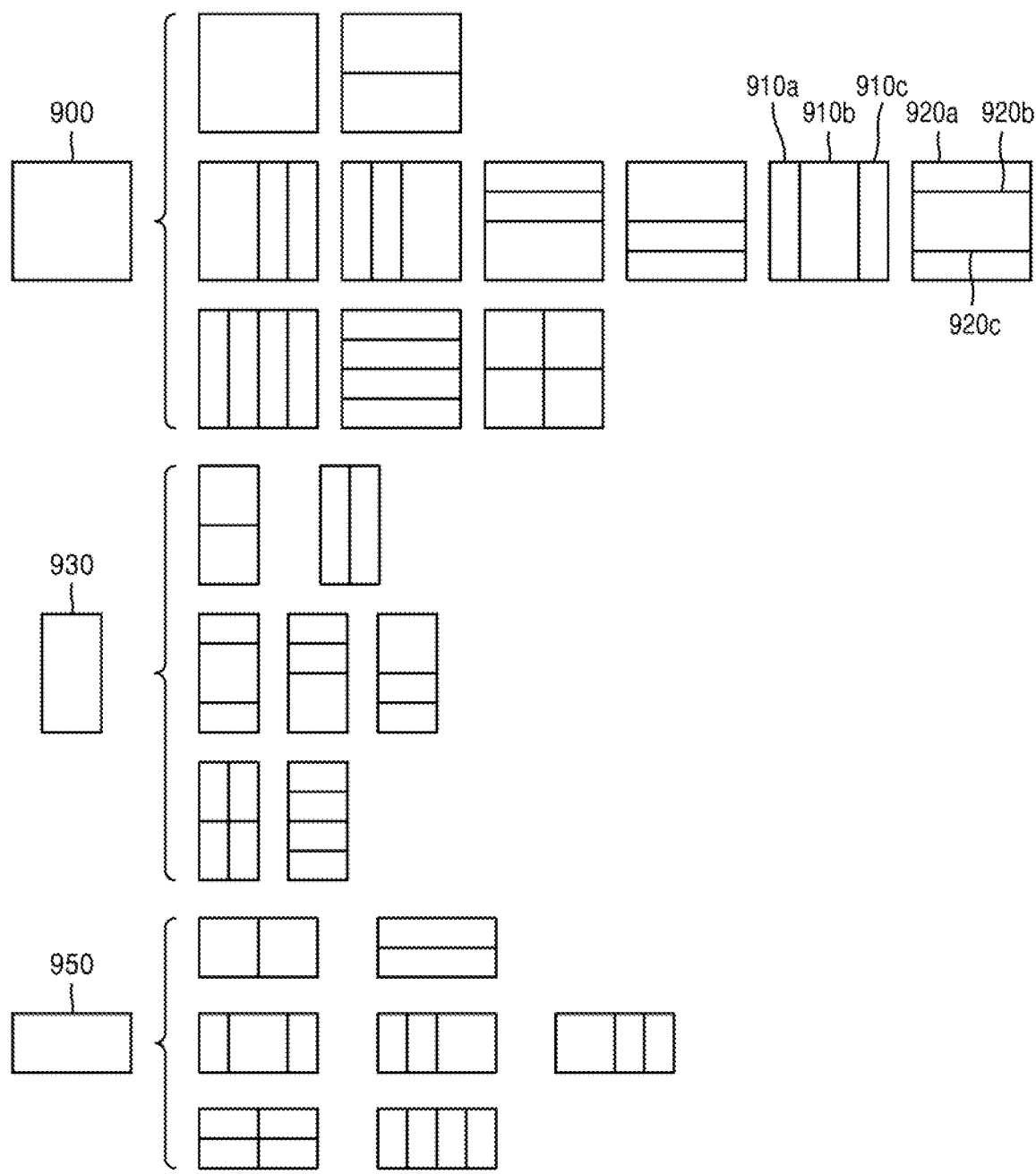
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the height of the first coding unit 900 in half, it may be determined that the first coding unit 900 does not satisfy the condition for processing in the preset order. Also, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
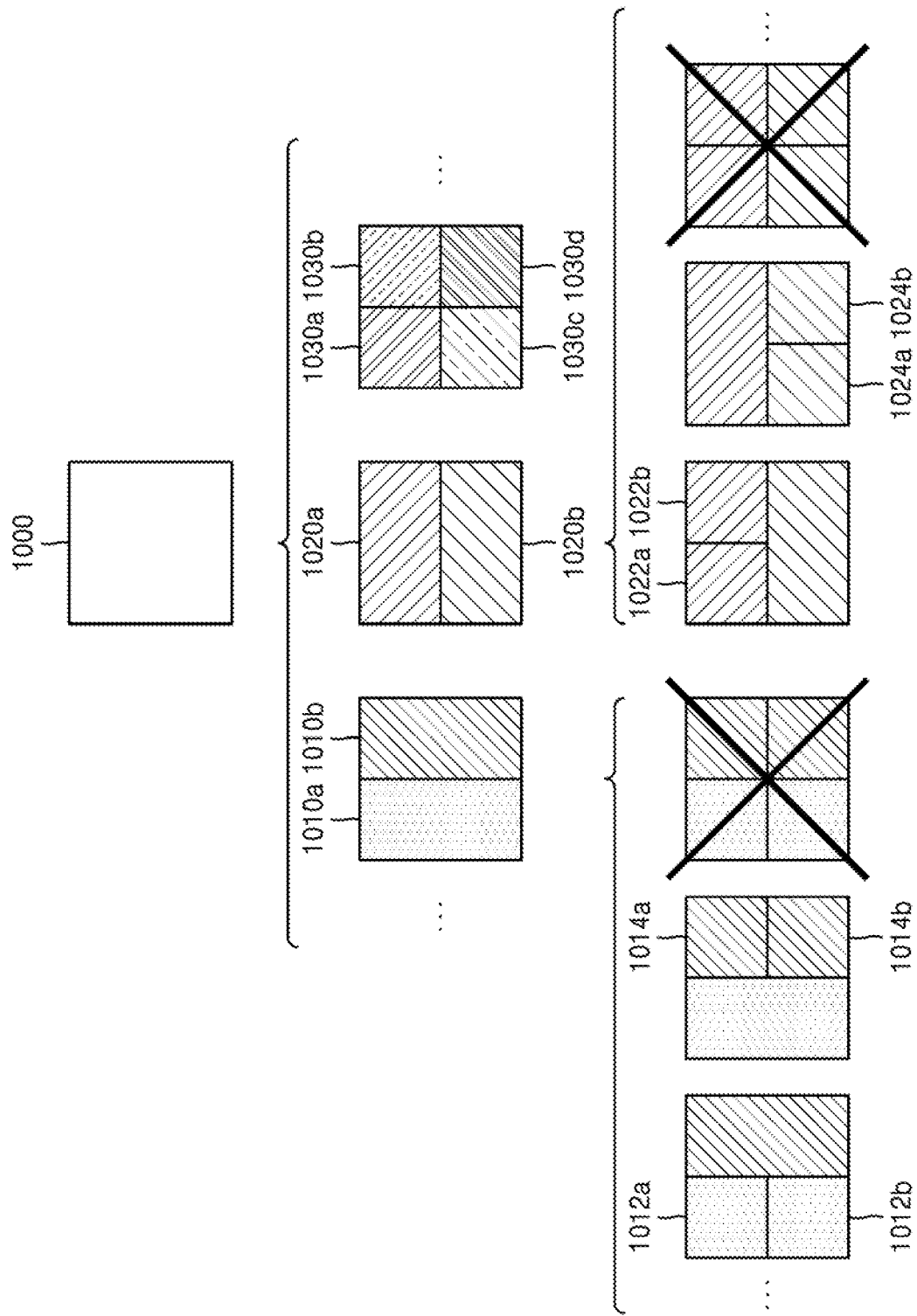
FIG. 10 illustrates that a shape into which a second coding unit is splittable is restricted when the second coding unit having a non-square shape, which is determined when an image decoding apparatus splits a first coding unit, satisfies a preset condition, according to an embodiment.

FIG. 10 illustrates that a shape into which a second coding unit is splittable is restricted when the second coding unit having a non-square shape, which is determined when an image decoding apparatus splits a first coding unit, satisfies a preset condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b, or 1020a and 1020b may be independently split. As such, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
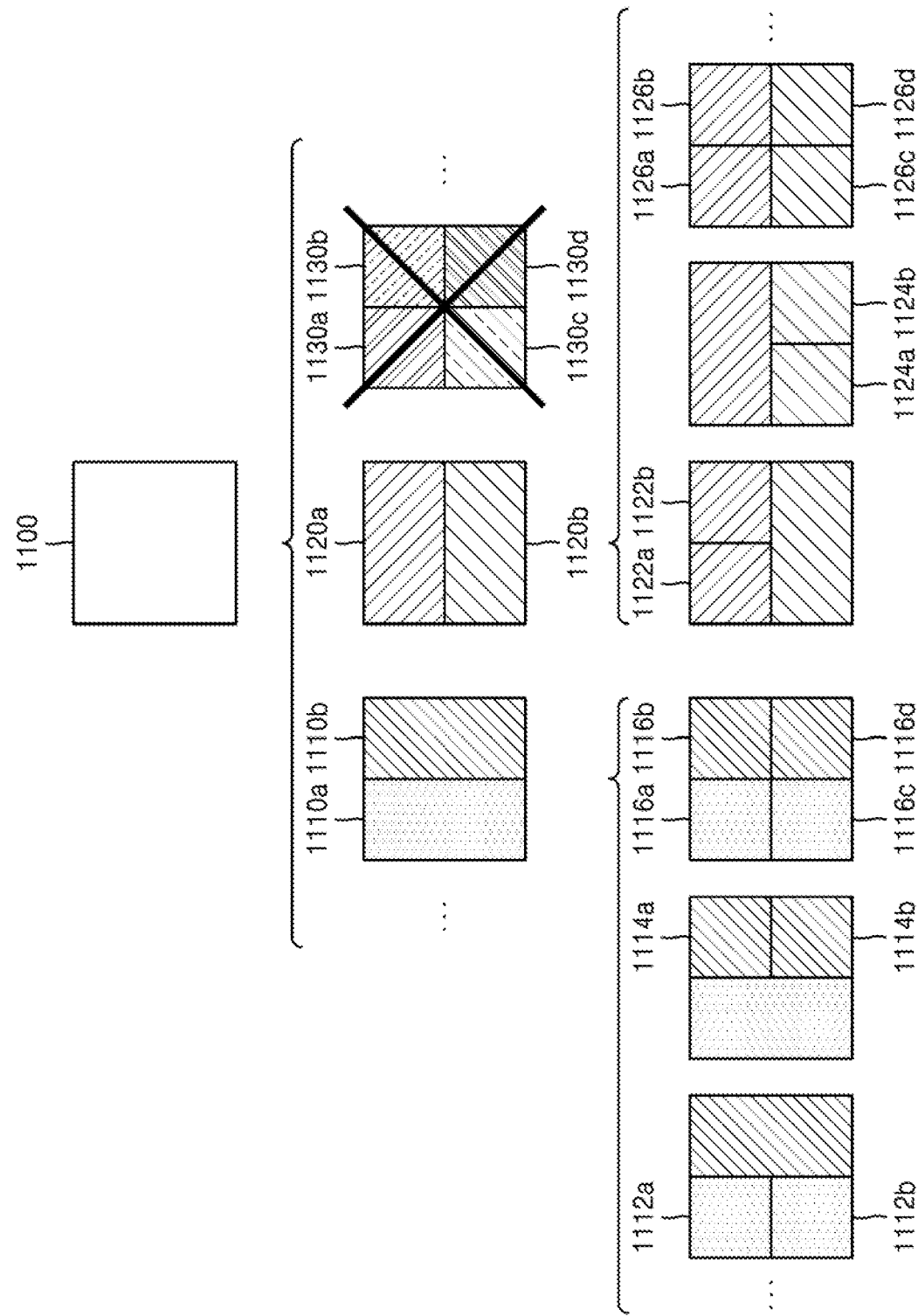
FIG. 11 illustrates a process, performed by an image decoding apparatus, of splitting a square coding unit when split shape mode information indicates that the square coding unit is not to be split into four square coding units, according to an embodiment.

FIG. 11 illustrates a process, performed by an image decoding apparatus, of splitting a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
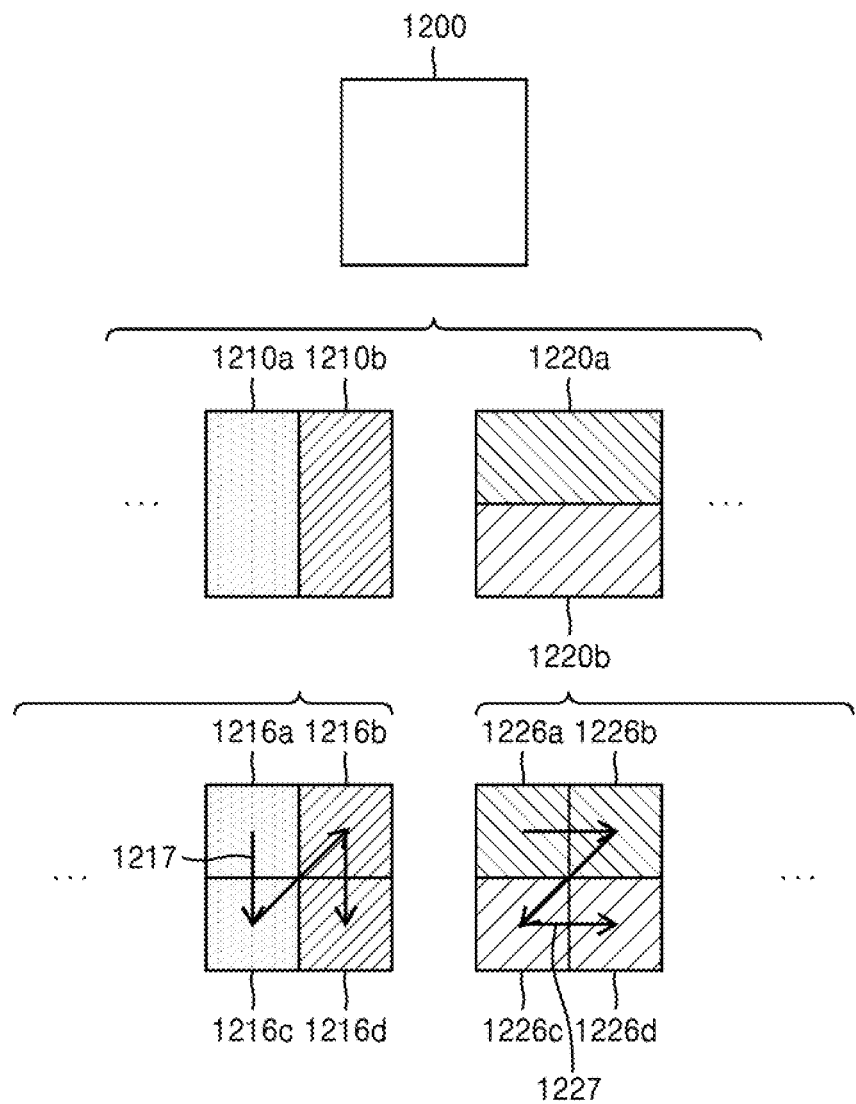
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and(or?) 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
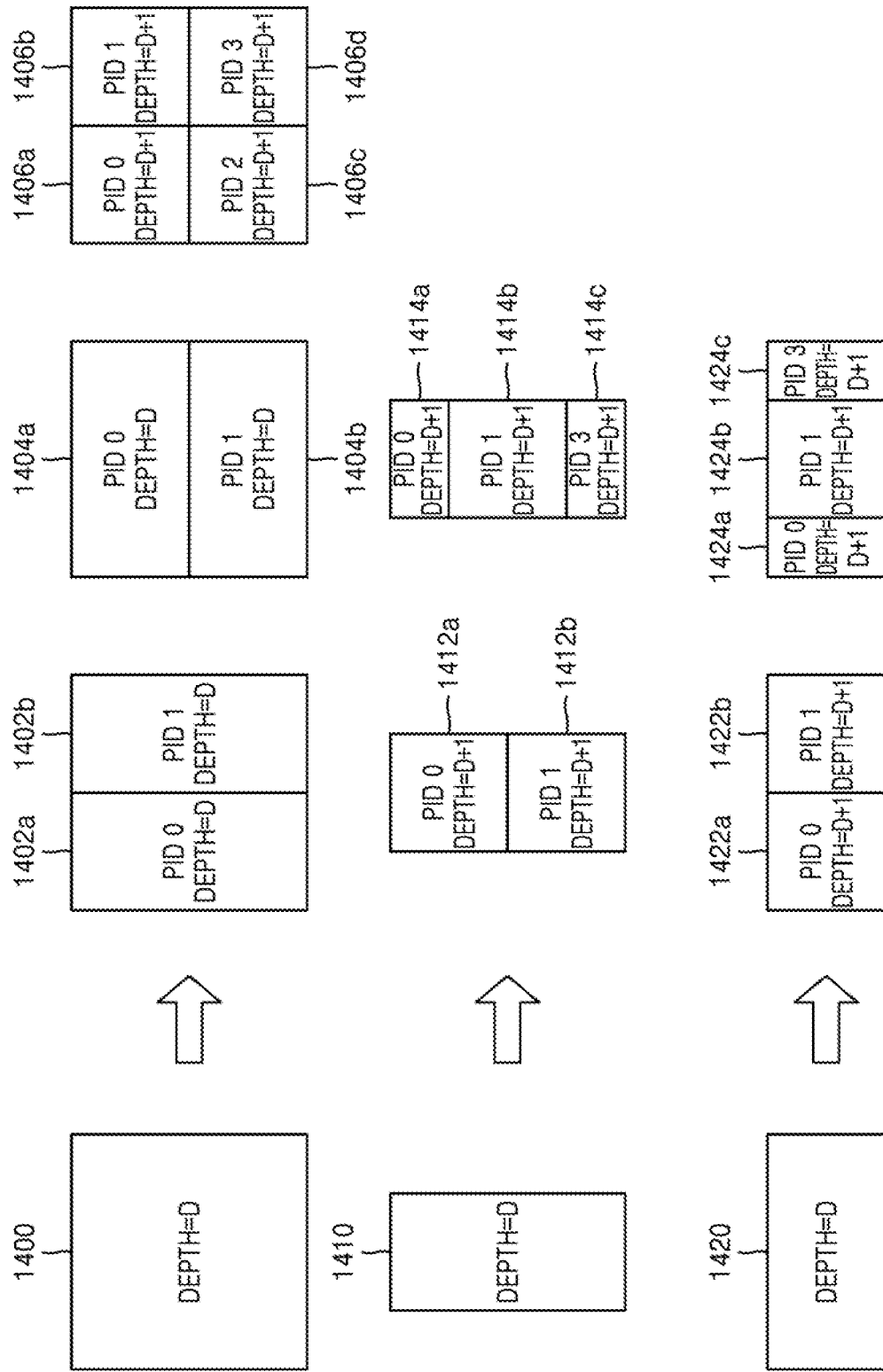
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PI D of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the preset location are not limited to the above-described examples, and various PI Ds and various locations and sizes of coding units may be used.

According to an embodiment, the image decoding apparatus 100 may use a preset data unit where a coding unit starts to be recursively split.

Figure 15:
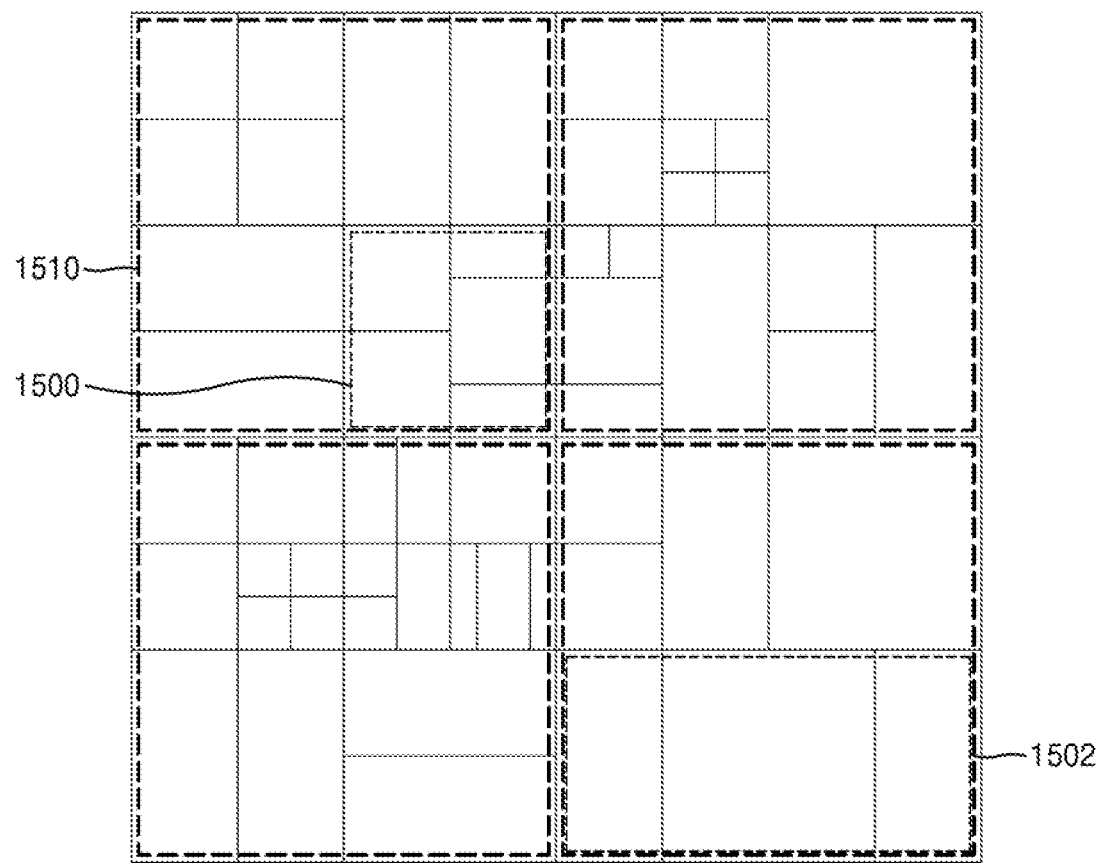
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a preset condition. That is, the receiver 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
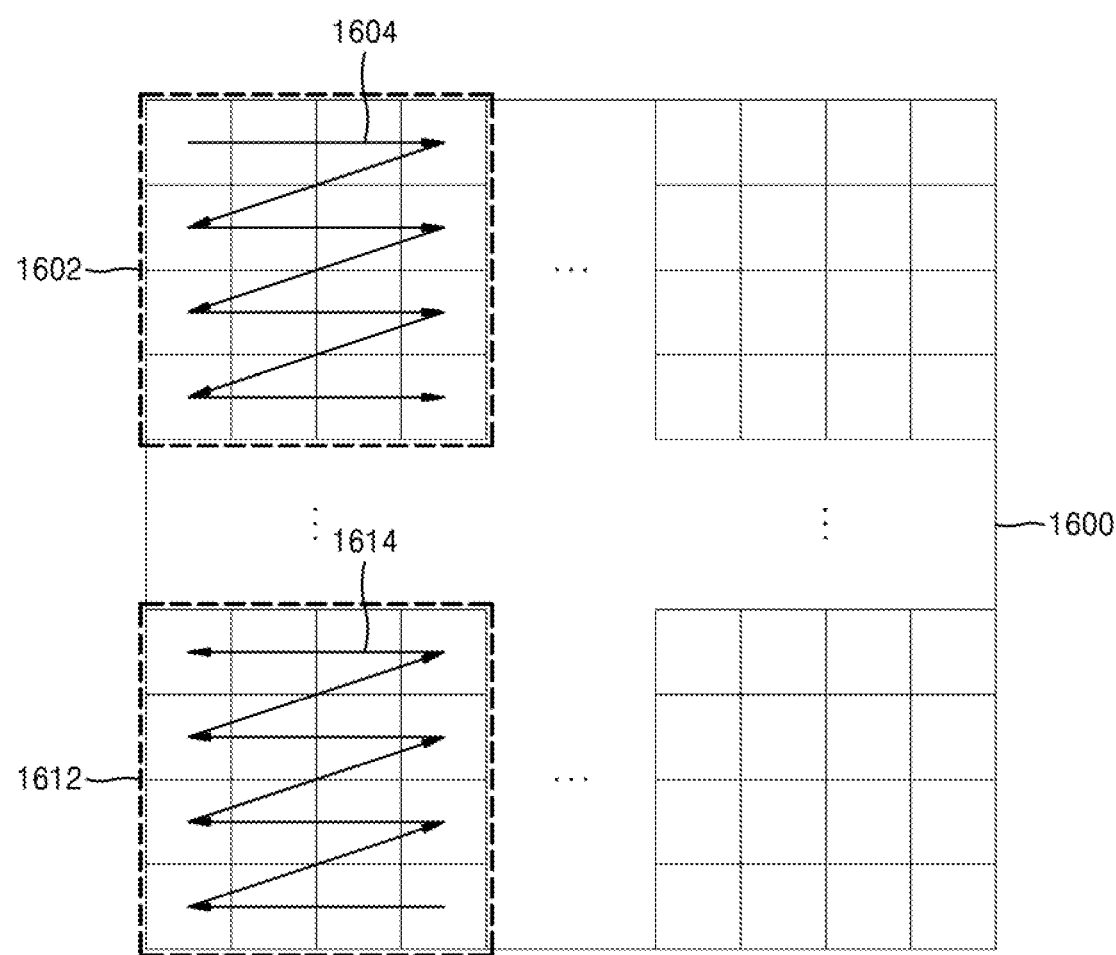
FIG. 16 illustrates a processing block serving as a unit for determining a determination order of reference coding units included in a picture, according to an embodiment.

FIG. 16 illustrates a processing block serving as a unit for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, the embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the region. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Hereinbelow, a video encoding or decoding method and apparatus according to an embodiment of the disclosure will be described in detail with reference to FIGS. 17 through 20, in which a luma block including a luma sample corresponding to a chroma sample at a lower-right location with respect to a center of a current chroma block is determined, a chroma intra prediction mode of the current chroma block is determined based on an intra prediction mode of the determined luma block, and intra prediction is performed on the current chroma block, based on the determined chroma intra prediction mode.

Figure 17:
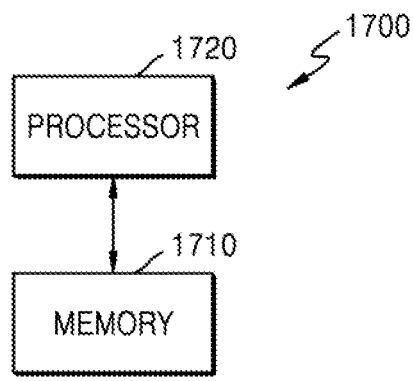
FIG. 17 illustrates a block diagram of a video encoding apparatus according to an embodiment.

FIG. 17 illustrates a block diagram of a video encoding apparatus according to an embodiment.

A video encoding apparatus 1700 according to an embodiment may include a memory 1710 and at least one processor 1720 connected to the memory 1710. The operations of the video encoding apparatus 1700 according to the embodiment may be performed as individual processors or may be performed under the control of a central processor. Also, the memory 1710 of the video encoding apparatus 1700 may store data received from the outside, data generated by a processor, for example, chroma intra prediction mode information about a current chroma block, etc.

The processor 1720 of the video encoding apparatus 1700 may be configured to determine a luma block including a luma sample corresponding to a chroma sample at a lower-right location with respect to a center of a current chroma block, determine a chroma intra prediction mode of the current chroma block based on an intra prediction mode of the determined luma block, perform intra prediction on the current chroma block, based on the determined chroma intra prediction mode, and generate chroma intra prediction mode information about the current chroma block.

Hereinbelow, specific operations of a video encoding method will be described in detail with reference to FIG. 18, in which the video encoding apparatus 1700 according to an embodiment determines a luma block including a luma sample corresponding to a chroma sample at a lower-right location with respect to a center of a current chroma block, determines a chroma intra prediction mode of the current chroma block based on an intra prediction mode of the determined luma block, performs intra prediction on the current chroma block, based on the determined chroma intra prediction mode, and generates chroma intra prediction mode information about the current chroma block.

Figure 18:
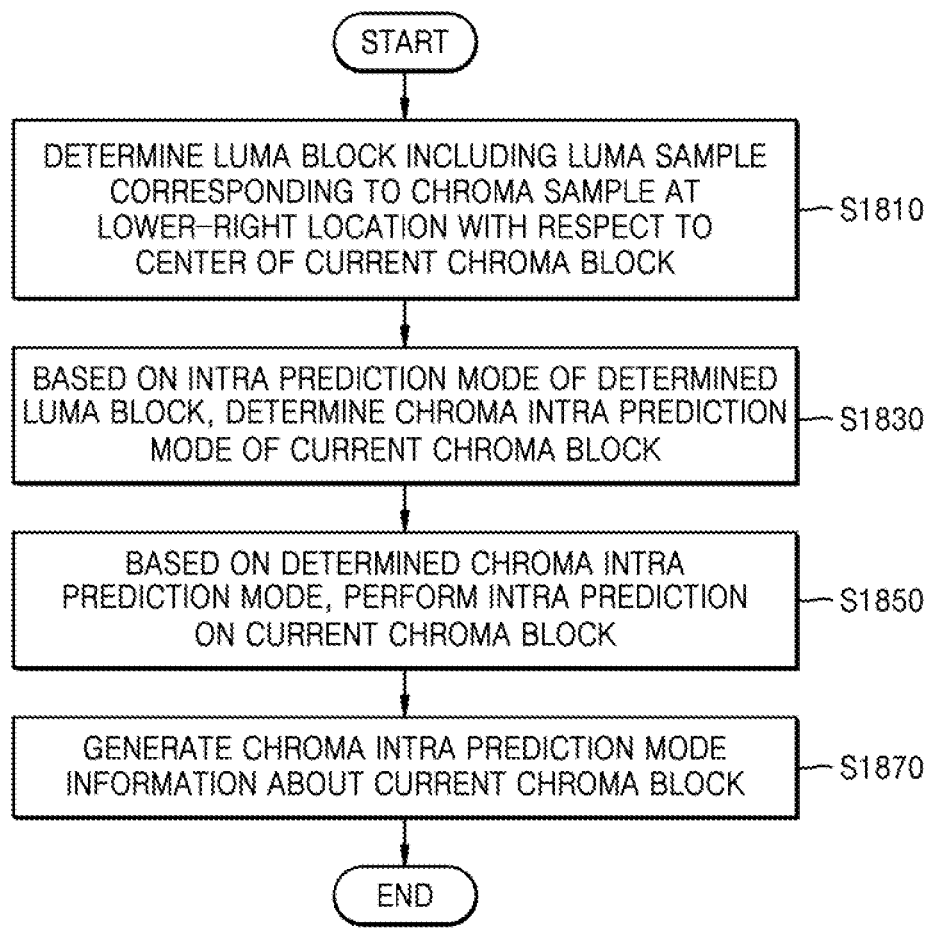
FIG. 18 illustrates a flowchart of a video encoding method according to an embodiment.

FIG. 18 illustrates a flowchart of a video encoding method according to an embodiment.

Referring to FIG. 18, in operation S1810, the video encoding apparatus 1700 may determine a luma block including a luma sample corresponding to a chroma sample at a lower-right location with respect to a center of a current chroma block.

According to an embodiment, the chroma sample at the lower-right location with respect to the center of the current chroma block may be a chroma sample which is located in the right side by ½ of a width of the current chroma block and located at the lower side by ½ of a height of the current chroma block, from a chroma sample at a top-left location of the current chroma block. In detail, when the top-left location of the current chroma block is (0,0), the width and height of the current chroma block are respectively W and H, and right and lower directions are positive directions, the chroma sample may be a sample located at (W/2, H/2).

According to another embodiment, a luma block including a luma sample corresponding to the chroma sample at the upper-left location with respect to the center of the current chroma block may be determined. In detail, the top-left location of the current chroma block is (0,0), the width and height of the current chroma block are respectively W and H, and right and lower directions are positive directions, the chroma sample may be a sample located at ((W/2)−1, (H/2)−1).

According to an embodiment, the current chroma block and the determined luma block may be split into different tree structures. A tree structure into which a luma block and a chroma block are split will be described below with reference to FIGS. 25 through 27.

According to an embodiment, a luma region corresponding to the current chroma block may include a plurality of luma blocks.

According to another embodiment, the luma region corresponding to the current chroma block may include a part of a luma block.

In operation S1830, the video encoding apparatus 1700 may determine a chroma intra prediction mode of the current chroma block based on an intra prediction mode of the determined luma block.

In operation S1850, the video encoding apparatus 1700 may perform intra prediction on the current chroma block, based on the determined chroma intra prediction mode.

In operation S1870, the video encoding apparatus 1700 may generate chroma intra prediction mode information about the current chroma block.

According to an embodiment, the chroma intra prediction mode information may indicate one of prediction modes including a planar mode, a direct current (DC) mode, a vertical mode, a horizontal mode, and a direct mode (DM).

According to an embodiment, when an intra prediction mode of the current chroma block is the same as the intra prediction mode of the determined luma block, the chroma intra prediction mode information may indicate a DM.

According to an embodiment, the chroma intra prediction mode information may be determined through calculation of sum of transform difference (SATD) or rate distortion optimization (RDO) and then signaled.

Figure 19:
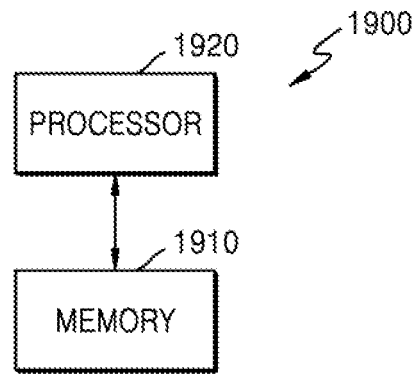
FIG. 19 illustrates a block diagram of a video decoding apparatus according to an embodiment.
Figure 20:
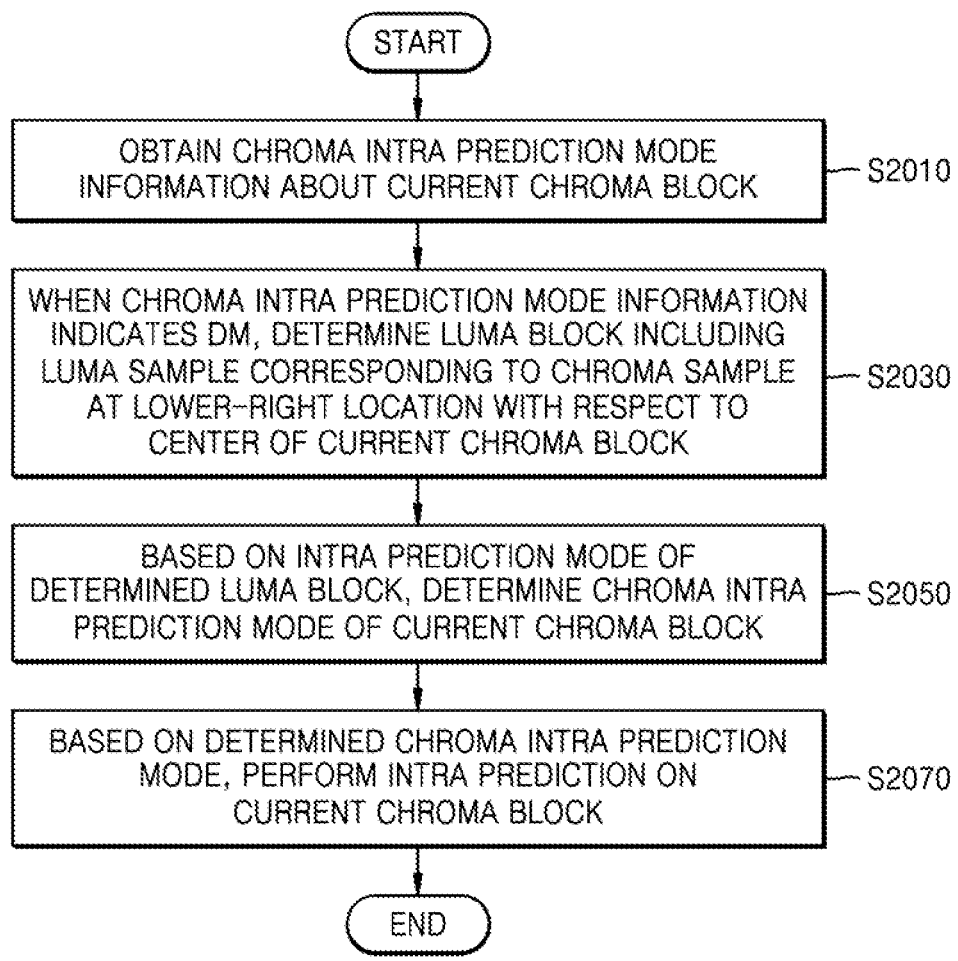
FIG. 20 illustrates a flowchart of a video decoding method according to an embodiment.

FIGS. 19 and 20 are a block diagram of a video decoding apparatus according to an embodiment and a flowchart of a video decoding method according to an embodiment, which correspond to the video encoding apparatus and the video encoding method described above, respectively.

FIG. 19 illustrates a block diagram of a video decoding apparatus according to an embodiment.

According to an embodiment, a video decoding apparatus 1900 may include a memory 1910 and at least one processor 1920 connected to the memory 1910. According to the embodiment, the operations of the video decoding apparatus 1900 may be performed as individual processors or may be performed under the control of a central processor. Also, the memory 1910 of the video decoding apparatus 1900 may store data received from the outside, data generated by a processor, for example, chroma intra prediction mode information about a current chroma block, etc.

The processor 1920 of the video decoding apparatus 1900 may be configured to obtain chroma intra prediction mode information about a current chroma block, when the chroma intra prediction mode information indicates a DM, determine a luma block including a luma sample corresponding to a chroma sample at a lower-right location with respect to a center of the current chroma block, determine a chroma intra prediction mode of the current chroma block based on an intra prediction mode of the determined luma block, and perform intra prediction on the current chroma block, based on the determined chroma intra prediction mode.

Hereinbelow, specific operations of a video decoding method will be described in detail with reference to FIG. 20, in which the video decoding apparatus 1900 according to an embodiment obtains chroma intra prediction mode information about the current chroma block, when the chroma intra prediction mode information indicates a DM, determines a luma block including a luma sample corresponding to a chroma sample at a lower-right location with respect to a center of the current chroma block, determine a chroma intra prediction mode of the current chroma block based on an intra prediction mode of the determined luma block, and perform intra prediction on the current chroma block, based on the determined chroma intra prediction mode.

FIG. 20 illustrates a flowchart of a video decoding method according to an embodiment.

Referring to FIG. 20, in operation S2010, the video decoding apparatus 1900 may obtain chroma intra prediction mode information about a current chroma block.

According to an embodiment, the chroma intra prediction mode information may indicate one of prediction modes including a planar mode, a DC mode, a vertical mode, a horizontal mode, and a DM.

In operation S2030, when the chroma intra prediction mode information indicates a DM, the video decoding apparatus 1900 may determine a luma block including a luma sample corresponding to a chroma sample at a lower-right location with respect to a center of the current chroma block.

According to an embodiment, the chroma sample at the lower-right location with respect to the center of the current chroma block may be a chroma sample which is located in the right side by ½ of a width of the current chroma block and located at the lower side by ½ of a height of the current chroma block, from a chroma sample at a top-left location of the current chroma block. In detail, when the top-left location of the current chroma block is (0,0), the width and height of the current chroma block are respectively W and H, and right and lower directions are positive directions, the chroma sample may be a sample located at (W/2, H/2).

According to another embodiment, a luma block including a luma sample corresponding to the chroma sample at the upper-left location with respect to the center of the current chroma block may be determined. In detail, the top-left location of the current chroma block is (0,0), the width and height of the current chroma block are respectively W and H, and right and lower directions are positive directions, the chroma sample may be a sample located at ((W/2)−1, (H/2)−1).

According to an embodiment, the current chroma block and the determined luma block may be split into different tree structures.

According to an embodiment, a luma region corresponding to the current chroma block may include a plurality of luma blocks.

According to another embodiment, the luma region corresponding to the current chroma block may include a part of a luma block.

In operation S2050, the video decoding apparatus 1900 may determine a chroma intra prediction mode of the current chroma block based on an intra prediction mode of the determined luma block.

According to an embodiment, when the chroma intra prediction mode information indicates the DM, the chroma intra prediction mode may be the same as the intra prediction mode of the luma block including the luma sample corresponding to the chroma sample at the lower-right location with respect to the center of the current chroma block.

In operation S2070, the video decoding apparatus 1900 may perform intra prediction on the current chroma block, based on the determined chroma intra prediction mode.

According to an embodiment, a method of determining a luma block including a luma sample corresponding to a chroma sample at a lower-right location with respect to the center of the current chroma block, determining a chroma intra prediction mode of the current chroma block based on an intra prediction mode of the determined luma block, and performing intra prediction on the current chroma block, based on the determined chroma intra prediction mode will be described below with reference to FIG. 21.

Figure 21:
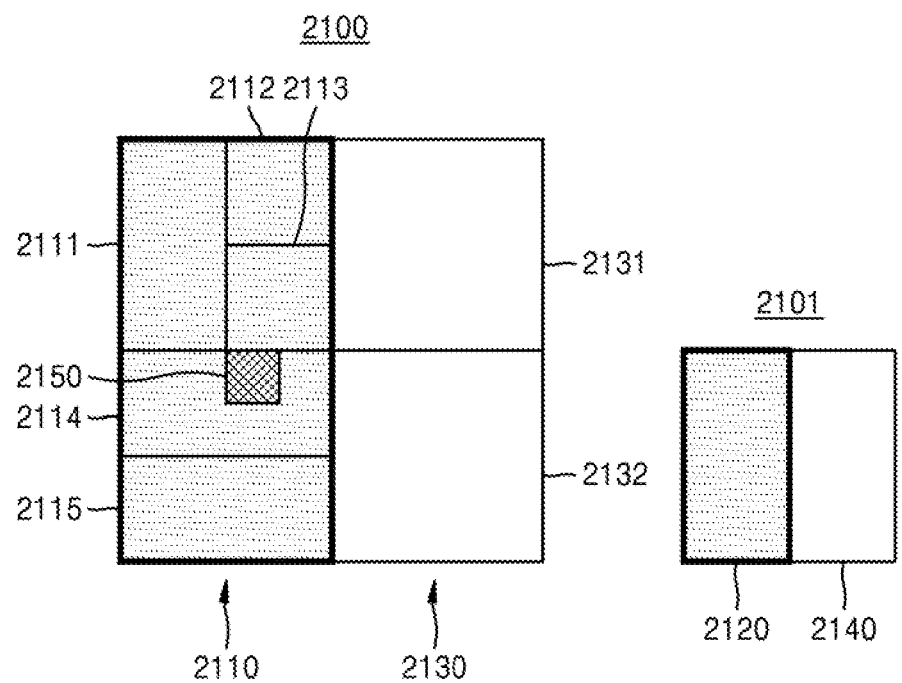
FIG. 21 illustrates a diagram for describing a method of performing chroma prediction on a current chroma block, based on a prediction mode of a luma block including a luma sample corresponding to a chroma sample at a lower-right location with respect to a center of the current chroma block, according to an embodiment.

FIG. 21 illustrates a diagram for describing a method of performing chroma prediction on a current chroma block, based on a prediction mode of a luma block including a luma sample corresponding to a chroma sample at a lower-right location with respect to a center of the current chroma block, according to an embodiment.

Referring to FIG. 21, a left chroma block 2120 may correspond to a left luma region 2110 including five luma blocks 2111, 2112, 2113, 2114, and 2115, and a right chroma block 2140 may correspond to a right luma region 2130 including two luma blocks 2131 and 2132. A prediction mode of each of the chroma blocks may be determined from a luma region corresponding to each of the chroma blocks. In detail, in the left luma region 2110 corresponding to the left chroma block 2120, a luma block 2114 including a luma sample 2150 corresponding to a chroma sample at a lower-right location from the center of the left chroma block 2120 may be determined, and a prediction mode of the left chroma block 2120 may be determined based on a prediction mode of the luma block 2114. Also, in the case of the right chroma block 2140, in the right luma region 2130 corresponding to the right chroma block 2140, a lower luma block 2132 including a luma sample corresponding to a chroma sample at a lower-right location from the center of the right chroma block 2140 may be determined, and a prediction mode of the right chroma block 2140 may be determined based on a prediction mode of the lower luma block 2132.

Figure 22:
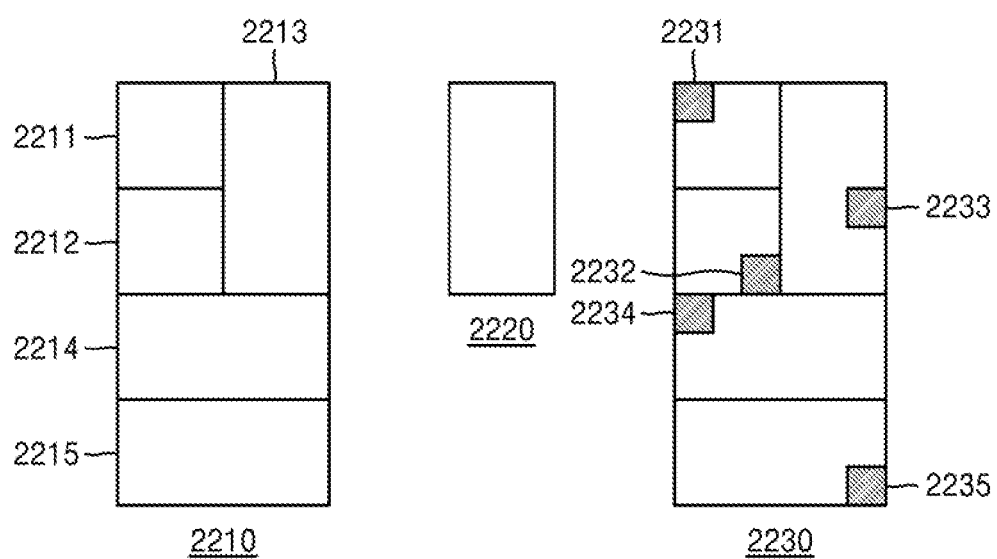
FIG. 22 illustrates a diagram for describing a method of determining a prediction mode of a chroma block, according to another embodiment.

FIG. 22 illustrates a diagram for describing a method of determining a prediction mode of a chroma block, according to another embodiment.

Referring to FIG. 22, a prediction mode of a chroma block 2220 may be determined by using a luma block including a luma sample corresponding to a chroma sample at a specific location from a luma region 2210 corresponding to the chroma block 2220 with a width-to-height ratio of 1:2, the luma region 2210 including a first luma block 2211, a second luma block 2212, a third luma block 2213, a fourth luma block 2214, and a fifth luma block 2215. For example, when the prediction mode of the chroma block 2220 is a DM, a chroma prediction mode may be determined by using a luma block determined from the luma region 2210 corresponding to the chroma block 2220. In detail, in a luma region 2230 to which a DM is applied, the first luma block 2211, the second luma block 2212, the third luma block 2213, the fourth luma block 2214, and the fifth luma block 2215 may be candidate luma blocks for the DM, and one luma block may be determined from among the candidate luma blocks, the first luma block 2211 including a first luma sample 2231 corresponding to a chroma sample at a top-left location of the chroma block 2220, the second luma block 2212 including a second luma sample 2232 corresponding to a chroma sample located at an upper-left location with respect to a center of the chroma block 2220, the third luma block 2214 including a third luma sample 2234 corresponding to a chroma sample at a lower-right location with respect to the left side of the chroma block 2220, the fourth luma block 2213 including a fourth luma sample 2233 corresponding to a chroma sample at a location lower-left of a ¼ point of the right side of the chroma block 2220, and the fifth luma block 2215 including a fifth luma sample 2235 corresponding to a chroma sample at a bottom-right location of the chroma block 2220.

According to another embodiment, when a width and height of the chroma block are the same as each other, in a luma region including all luma blocks corresponding to the chroma block, the candidate luma blocks for the DM may be luma blocks including luma samples corresponding to chroma samples at four corners of the chroma block and a center location of the chroma block.

According to another embodiment, as shown in FIG. 22, when the width-to-height ratio is 1:2, in the luma region including all the luma blocks corresponding to the chroma block, the candidate luma blocks for the DM may be luma blocks including luma samples corresponding to chroma samples at a center location of the top side of the chroma block, a center location of the chroma block, and a center location of the bottom side of the chroma block.

Figure 23:
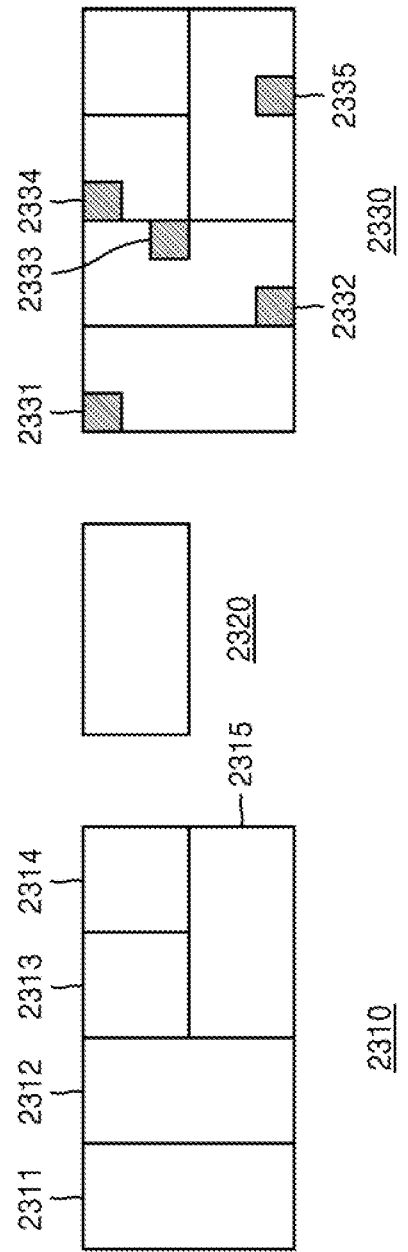
FIG. 23 illustrates a diagram for describing a method of determining a prediction mode of a chroma block, according to another embodiment.

FIG. 23 illustrates a diagram for describing a method of determining a prediction mode of a chroma block, according to another embodiment.

Referring to FIG. 23, a prediction mode of a chroma block 2320 may be determined by using a luma block including a luma sample corresponding to a chroma sample at a specific location from a luma region 2310 corresponding to a chroma block 2320 with a width-to-height ratio of 2:1, the luma region 2310 including a first luma block 2311, a second luma block 2312, a third luma block 2313, a fourth luma block 2314, and a fifth luma block 2315. For example, when the prediction mode of the chroma block 2320 is a DM, a chroma prediction mode may be determined by using a luma block determined from all of the luma blocks 2310 corresponding to the chroma block 2320. In detail, in a luma region 2330 to which a DM is applied the first luma block 2311, the second luma block 2312, the third luma block 2313, and the fifth luma block 2315 may be candidate luma blocks for the DM, and one luma block may be determined from among the candidate luma blocks, the first luma block 2311 including a first luma sample 2231 corresponding to a chroma sample at a top-left location of the chroma block 2320, the second luma block 2312 including a second luma sample 2332 corresponding to a chroma sample at an upper-right location at a ¼ point of the bottom side of the chroma block 2320 and a third luma sample 2333 corresponding to a chroma sample at an upper-left location with respect to a center of the chroma block 2320, the third luma block 2313 including a fourth luma sample 2234 corresponding to a chroma sample at a lower-right location with respect to a center of the top side of the chroma block 2320, and the fifth luma block 2315 including a fifth luma sample 2335 corresponding to a chroma sample at an upper-right location at a ¾ point of the bottom side of the chroma block 2320.

According to another embodiment, as shown in FIG. 23, when the width-to-height ratio is 2:1, the candidate luma blocks for the DM may be luma blocks including luma samples corresponding to chroma samples at a center location of the left side of a chroma block, a center location of the chroma block, and a center location of the right side of the chroma block.

According to another embodiment, when the DM is applied to an inter slice, a luma block to which inter prediction is applied and luma blocks to which intra prediction is applied may be included together in a luma region corresponding to the chroma block. In this case, when an intra prediction mode may not be derived from a candidate luma block for a DM including a luma sample corresponding to a chroma sample at a specific location, according to a default setting, a specific intra prediction mode such as a DC mode, a planar mode, or the like may be set as a candidate prediction mode for a DM. Also, when a prediction mode of the candidate luma block for the DM including the luma sample corresponding to the chroma sample at the specific location is an inter prediction mode, the candidate prediction mode for the DM may be set as the inter prediction mode. In this case, the candidate prediction mode for the DM may include both an intra prediction mode and an inter prediction mode.

According to another embodiment, when a plurality of luma blocks correspond to a chroma block in an inter slice, a prediction mode of the chroma block may be determined by using a prediction mode of a luma block including a luma sample corresponding to a specific location (a center, top-left, top-right, bottom-left, or bottom-right location) of the chroma block. For example, when a prediction mode of a luma block including a luma sample corresponding to a center (a location (W/2, H/2) obtained by moving W/2 to the right and H/2 to the bottom from a top-left location (0,0) of the chroma block) of a chroma block with a size of W:H is an intra prediction mode, prediction may be performed on the chroma block by changelessly using the intra prediction mode of the luma block. As another example, when a prediction mode of a luma block including a luma sample corresponding to a center location of the chroma block is an inter prediction mode, prediction may be performed on the chroma block by changelessly using motion information of the luma block.

According to another embodiment, when a plurality of luma blocks correspond to a chroma block in an inter slice, a prediction mode of the chroma block may be separately signaled. In this case, a prediction mode independent from the luma blocks may be transmitted, and a prediction mode may be derived based on the luma blocks.

According to another embodiment, when candidate luma blocks for a DM are determined as luma blocks respectively including luma samples corresponding to chroma samples at four corners and a center location of the chroma block, an order of DM candidates may be determined according to a ratio of the chroma block.

In detail, assuming that a luma sample corresponding to a chroma sample at the center location of the chroma block is a first luma sample, a luma sample corresponding to a chroma sample at a top-left location of the chroma block is a second luma sample, a luma sample corresponding to a chroma sample at an upper-right location of the chroma block is a third luma sample, a luma sample corresponding to a chroma sample at a lower-left location of the chroma block is a fourth luma sample, and a luma sample corresponding to a chroma sample at a lower-right location of the chroma block is a fifth luma sample, when a width and height of the chroma block is the same as each other, the candidate luma blocks for the DM mode may be determined in an order of the first luma sample, the second luma sample, the third luma sample, the fourth luma sample, and the fifth luma sample. Also, when the width of the chroma block is greater than the height of the chroma block, the candidate luma blocks for the DM may be determined in an order of the second luma sample, the third luma sample, the first luma sample, the fourth luma sample, and the fifth luma sample, and when the height of the chroma block is greater than the width of the chroma block, the candidate luma blocks for the DM may be determined in an order of the second luma sample, the fourth luma sample, the first luma sample, the third luma sample, and the fifth luma sample. That is, the candidate luma blocks for the DM may be adaptively determined according to the ratio of the chroma block.

According to another embodiment, locations of luma samples, an order in which luma samples are selected, and the number of locations of luma samples, which determine the candidate luma blocks for the DM, may be changed according to a size, ratio, and region of the chroma block.

According to another embodiment, the candidate luma blocks for the DM may be determined by using predetermined locations of chroma samples as they are, and the candidate luma blocks for the DM may also be determined by using, as a candidate location, a location obtained by averaging some of the predetermined locations of the chroma samples.

According to another embodiment, when luma blocks respectively including luma samples corresponding to chroma samples corresponding to two or more locations of the chroma block have different prediction modes, a chroma prediction mode may be determined as a DC mode.

According to another embodiment, when the chroma prediction mode is a DM, the DC mode or planar mode may be set to be always used. When a plurality of luma blocks included in a luma region corresponding to the chroma block have various intra prediction modes, the DC mode or planar mode may be effective to reduce an average of prediction errors.

According to another embodiment, prediction is performed on one chroma block, based on prediction modes used in a plurality of luma blocks included in a luma region corresponding to one chroma block, and transformation may be performed on the one chroma block regardless of the luma blocks. Also, the prediction modes of the luma region may be intra prediction modes or inter prediction modes. An order in which chroma prediction is performed may be according to an order in which the luma blocks are coded. Alternatively, the chroma prediction may be performed in an order from top to bottom or left to right, regardless of a coding order of the luma blocks.

According to another embodiment, a method may be used, of splitting a chroma block, in addition to luma blocks in which a plurality of luma samples included in a luma region corresponding to a chroma block are located, as candidates for the DM of the chroma block, into sub-chroma blocks and then performing chroma prediction on the sub-chroma blocks by using prediction modes of luma blocks included in a luma region corresponding to each of the sub-chroma blocks.

According to another embodiment, the chroma block may be uniformly split into sub-chroma blocks of a predetermined unit, and chroma prediction may be performed on the sub-chroma blocks by using prediction mode information of the luma region corresponding to each of the sub-chroma blocks. In detail, chroma prediction may be performed on the sub-chroma blocks, based on a prediction mode of an 8×8 luma region corresponding to a 4×4 sub-chroma block in a 4:2:0 color format. However, when it is determined that the chroma block performs a separate prediction mode, a predetermined prediction mode may be performed without using prediction information of the luma region.

According to another embodiment, in an inter slice, when the chroma block is a sub-block prediction mode for inter prediction, a prediction mode of a region, in the luma region corresponding to the chroma block, in which the prediction mode is an inter prediction mode may be used. In detail, when a center region of the luma region corresponding to the chroma block is an inter prediction mode, motion information of the center region may be determined as representative motion information. Thereafter, in a case where the chroma block is split into predetermined sub-chroma blocks and prediction mode information of a plurality of luma blocks each corresponding to each of the sub-chroma blocks are used, when motion information exists in a luma region corresponding to each of the sub-chroma blocks, inter prediction may be performed on the sub-chroma blocks by using the motion information. When motion information does not exist in the luma region corresponding to each of the sub-chroma blocks, inter prediction may be performed on the sub-chroma blocks by using the representative motion information.

According to another embodiment, in an inter slice, when a luma block corresponding to the chroma block include a plurality of sub-luma blocks and the sub-luma blocks are used together for intra prediction and inter prediction, a prediction mode of a sub-chroma block may be determined based on a prediction mode of a sub-luma block corresponding to the sub-chroma block. Accordingly, inter prediction and intra prediction may be concurrently used in one chroma block in units of sub-blocks.

Figure 24:
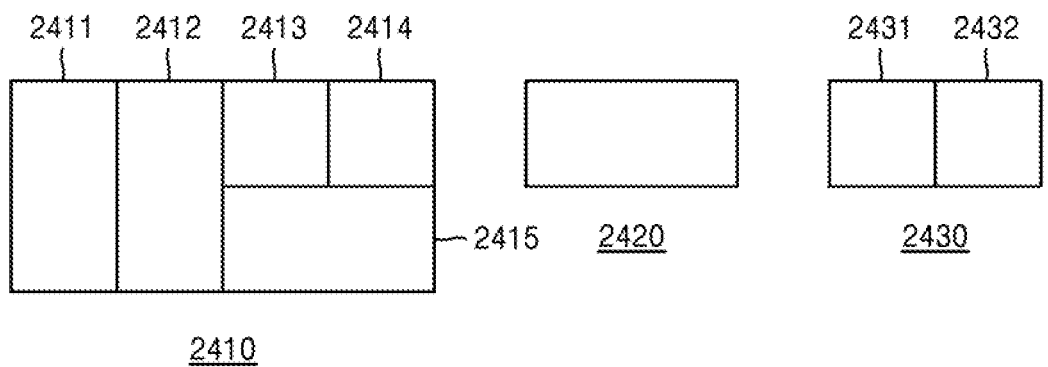
FIG. 24 illustrates a diagram for describing a method of predicting a chroma sample by using luma samples, according to another embodiment.

FIG. 24 illustrates a diagram for describing a method of predicting a chroma sample by using luma samples, according to another embodiment.

Linear model (LM) chroma mode or cross component intra prediction refers to a method of calculating a linear model using information of luma pixels and chroma pixels, and predicting a chroma sample from a reconstructed luma sample using the calculated linear model. In detail, a linear model is calculated through a relationship between an encoded or reconstructed luma sample around a current luma block corresponding to a current chroma block and an encoded or reconstructed chroma sample around the current chroma block, and the chroma sample of the current chroma block is predicted by applying the encoded or reconstructed luma sample of the current luma block to the calculated linear model.

Referring to FIG. 24, when a luma region 2410 corresponding to a chroma block 2420 includes a plurality of luma blocks 2411, 2412, 2413, 2414, and 2415, coding performance may vary depending on which luma block is selected to calculate a linear model.

In the specification, a "multiple LM chroma" mode refers to a method of calculating a plurality of linear models by dividing a region based on a luma sample value and dividing luma blocks into each region, and a "single LM chroma" mode refers to a method of calculating a single linear model for all luma blocks.

According to an embodiment, when the number of luma blocks included in a luma region corresponding to a chroma block is 3 or more, the multiple LM chroma mode may be determined to be used, and when the number of luma blocks included in the luma region corresponding to the chroma block is less than 3, the single LM chroma mode may be determined to be used. Alternatively, when the number of luma blocks included in the luma region corresponding to the chroma block is 2 or more, the multiple LM chroma mode may be determined to be used, and when the number of luma blocks included in the luma region corresponding to the chroma block is less than 3, the single LM chroma mode may be determined to be used.

According to another embodiment, when different modes are selected for three or more of the candidate luma blocks for the DM described above with reference to FIGS. 22 and 23, the multiple LM chroma mode may be determine to be used. Otherwise, the single LM chroma mode may be determined to be used.

According to another embodiment, an LM chroma mode prediction method may be determined by comparing intra prediction modes corresponding to two or more locations of a luma partition region corresponding to a chroma partition region. For example, an intra prediction mode corresponding to a top-left location and an intra prediction mode corresponding to a top-right location of a luma partition region corresponding to a current partition region are compared with each other. When the two intra prediction modes are the same as each other, the single LM chroma mode may be used, and when the two intra prediction modes are different from each other, the multiple LM chroma mode may be determined to be used. In this method, an LM chroma mode is determined without signaling a flag, based on the number of luma partition regions corresponding to the chroma partition region, and a prediction mode of the luma partition region. Also, a region to which an LM chroma mode is applied may vary depending on split information of a luma block. In detail, referring to FIG. 24, when there are five luma blocks 2411, 2412, 2413, 2414, and 2415 included in the luma region 2410 corresponding to the current chroma block 2420, the LM chroma mode may be applied by splitting a chroma block 2430 into two sub-blocks 2431 and 2432.

According to another embodiment, a region to which the multiple LM chroma mode is applied may be determined depending on split information of the luma block.

According to another embodiment, the LM chroma mode may be applied based on a size of a block. For example, when the size of the block is greater than N×M, the multiple LM chroma mode may be applied, and when the size of the block is less than or equal to N×M, the single LM chroma mode may be applied.

According to another embodiment, the LM chroma mode may be determined by comparing a range of a histogram of luma samples. For example, when a minimum value of the luma samples is X and a maximum value of the luma samples is Y, in the case of (Y−X)>TH (threshold), the multiple LM chroma mode may be applied, and in the case of (Y−X)<=TH, the single LM chroma mode may be applied. Here, TH may be determined as (1<<bit-depth)>>K. For example, when bit-depth is 10 bits and K is 2, TH may be (1<<10)>>2=256.

Figure 25:
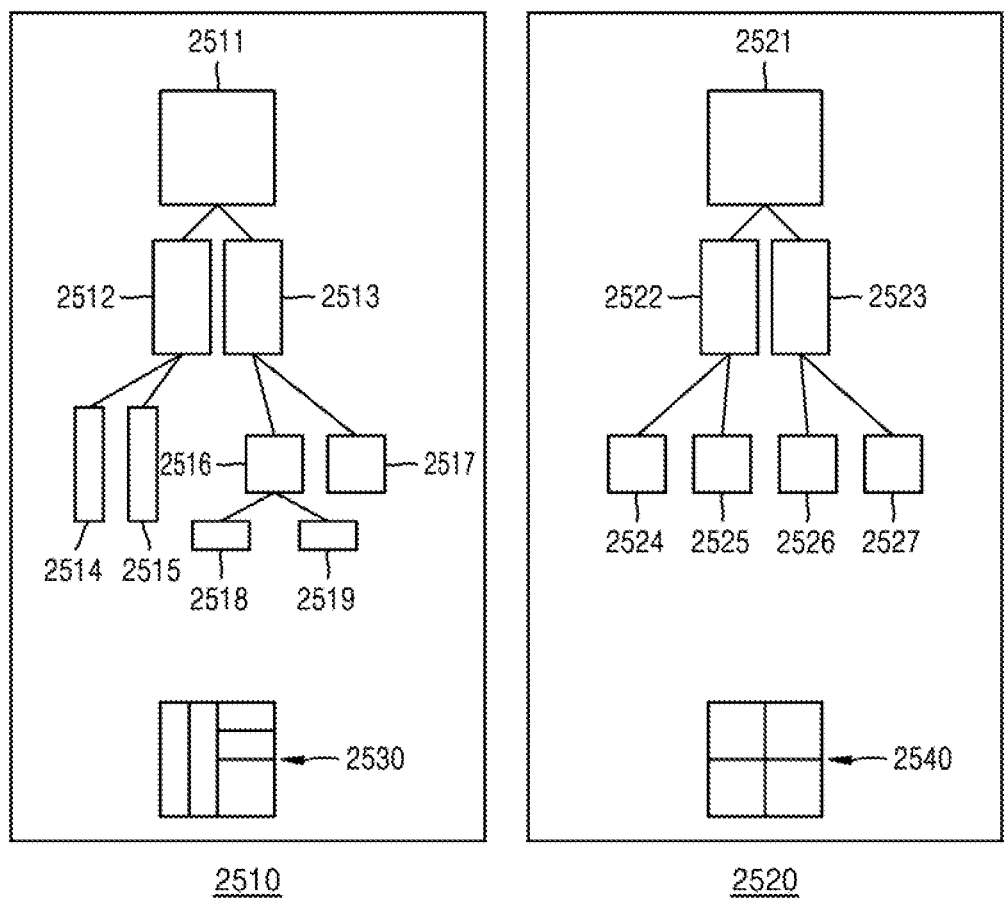
FIG. 25 illustrates a diagram for describing a method of splitting a luma block and a chroma block, according to an embodiment.

FIG. 25 illustrates a diagram for describing a method of splitting a luma block and a chroma block, according to an embodiment.

Referring to FIG. 25, a left tree structure 2510 shows a method of splitting a luma block 2530, a right tree structure 2520 shows a method of splitting a chroma block 2540 corresponding to the luma block 2530. In detail, until a first split, chroma blocks 2521, 2522, and 2523 are split in the same method as luma blocks 2511, 2512, and 2513 but, thereafter, chroma blocks 2524, 2525, 2526, and 2527 and luma blocks 2514, 2515, 2516, 2517, 2518, and 2519 are split in different methods. Also, according to those tree structures, a luma region corresponding to the chroma block 2524 includes a portion of the upper side of the two luma blocks 2514 and 2515, a luma region corresponding to the chroma block 2525 includes a portion of the lower side of the two luma blocks 2514 and 2515, the chroma block 2526 includes the two luma blocks 2518 and 2519, and the chroma block 2527 corresponds to the luma block 2517. Referring to FIG. 25, a luma region corresponding to a chroma block may include a plurality of luma blocks or may include a portion of a luma block. Also, one luma block may correspond to the chroma block.

According to an embodiment, when the luma block and the chroma block are split in different methods, a constraint may be placed so that a size of the luma block is always less that a size of the chroma block.

Figure 26:
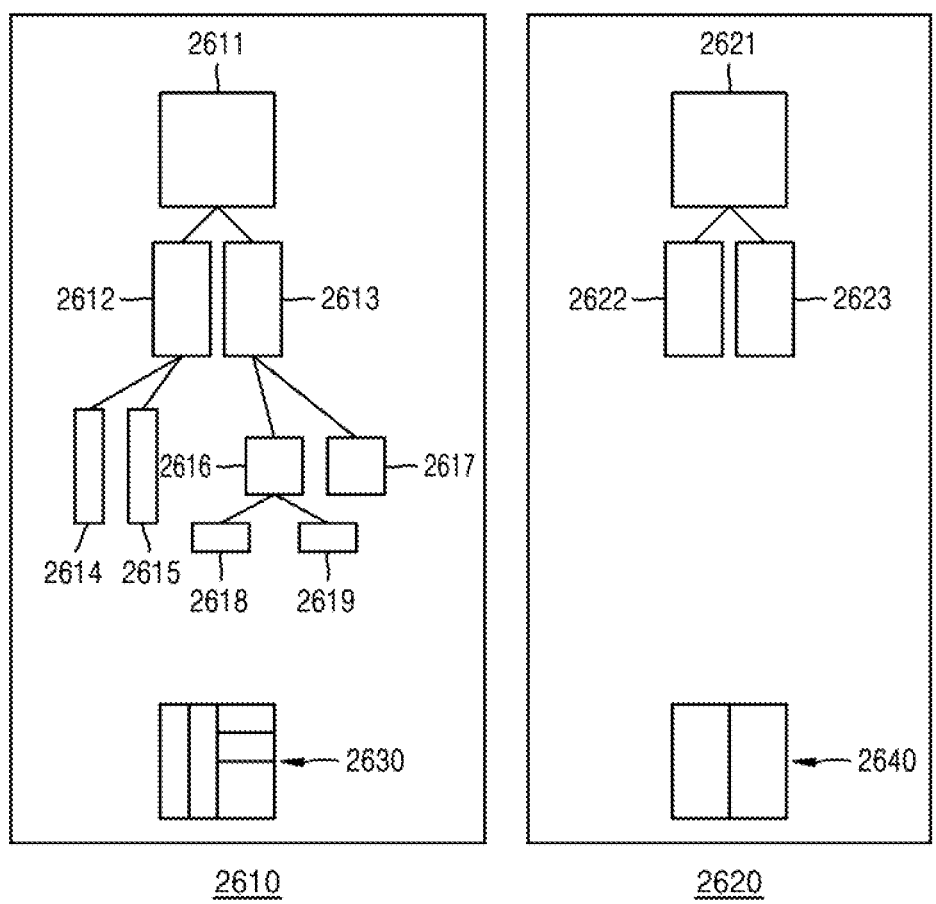
FIG. 26 illustrates a diagram for describing a method of splitting a luma block and a chroma block, according to another embodiment.

FIG. 26 illustrates a diagram for describing a method of splitting a luma block and a chroma block, according to another embodiment.

Referring to FIG. 26, a left tree structure 2610 shows a method of splitting a luma block 2630, a right tree structure 2620 shows a method of splitting a chroma block 2640 corresponding to the luma block 2630. In detail, until a first split, chroma blocks 2621, 2622, and 2623 are split in the same method as luma blocks 2611, 2612, and 2613 but, thereafter, only luma blocks 2614, 2615, 2616, 2617, 2618, and 2619 are split, whereas chroma blocks are not split.

Figure 27:
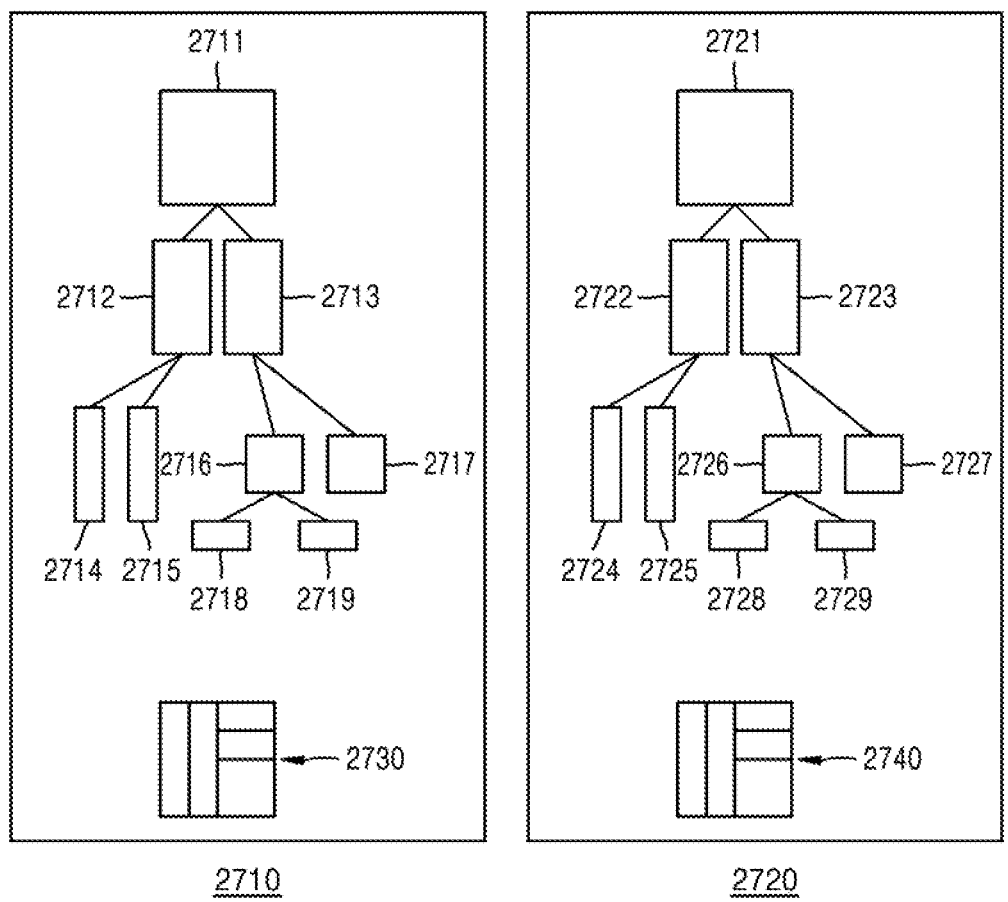
FIG. 27 illustrates a diagram for describing a method of splitting a luma block and a chroma block, according to another embodiment.

FIG. 27 illustrates a diagram for describing a method of splitting a luma block and a chroma block, according to another embodiment.

Referring to FIG. 27, a left tree structure 2710 shows a method of splitting a luma block 2730, a right tree structure 2620 shows a method of splitting a chroma block 2740 corresponding to the luma block 2730. In detail, chroma blocks 2721, 2722, 2723, 2724, 2725, 2726, 2727, 2728, and 2729 are split in the same method as luma blocks 2711, 2712, 2713, 2714, 2715, 2716, 2717, 2718, and 2719.

According to an embodiment, when a luma block and a chroma block are split in the same method, additional signaling may not be performed for splitting of the chroma block. That is, it may be determined that the same split method as the luma block is used for the chroma block.

According to an embodiment, it may be set so that a size of a luma block corresponding to a chroma block is not less than a size of the chroma block. For example, when the size of the luma block is M and the size of the chroma block to which the luma block corresponds is N, it may be set to always satisfy M<=N.

According to an embodiment, within a specific range, whether to use a method of splitting the luma block corresponding to the chroma block as a method of splitting the chroma block may be determined through a flag, and in other cases, a selected method or a predetermined method may be determined as the method of splitting the chroma block. For example, when the size of the luma block is 16×16 to 32×32, a flag indicating whether the method of splitting the chroma block is the same as the method of splitting the luma block may be transmitted. When the flag is not transmitted, splitting of the chroma block may be performed in the same manner as the method of splitting the luma block. Alternatively, when a value of a last transmitted flag is 0, the splitting of the chroma block may be performed in the same manner as the method of splitting the luma block, and when the value of the last transmitted flag is 1, the splitting of the chroma block may no longer be performed.

According to another embodiment, by determining a minimum size of the chroma block, it may be determined so that blocks having a size less than the minimum size do not exist. The minimum size of the chroma block may be determined based on a size of a block or a length of one side thereof. For example, when a minimum size of one side of the chroma block is 4, a size of the chroma block is 8×8, and a size of the luma block corresponding to the chroma block is 16×16, a triple tree method in which a block is split into three blocks is not allowed for the chroma block because the length of one side becomes less than 4. In this case, the triple tree method may be allowed for the luma block, and when the 16×16-sized luma block is split in the triple tree method, an 8×8-sized chroma block corresponding to the 16×16 luma block may be changelessly used without being split without a flag. However, when the method of splitting the chroma block is the same as the method of splitting the luma block, the triple tree method may not be allowed even for the luma block.

According to another embodiment, when a size of a smallest coding unit is 4, it may be set so that the minimum size is 4 even in a process of splitting the chroma block. For example, in a 4:2:0 YUV color format, a size of a chroma block corresponding to a 4×4-sized luma block is 2×2, but when a split structure of the chroma block is different from a split structure of the luma block, a minimum size of the chroma block may be determined to be 4×4. In this case, parameters related to splitting may be used respectively for the luma block and the chroma block.

When information about a minimum block size is signaled and signaling for a size of the smallest coding unit is performed based on a pixel of a picture, in the case of the chroma block, the minimum size of the chroma block may be determined according to a color format or a degree of sub-sampling of the chroma block compared to the luma block. In detail, when the color format is the 4:2:0 YUV color format and the size of the smallest coding unit is determined to be 4 based on the pixel of the picture, in a luma component Y, because the size of the luma block is the same as the pixel of the picture, 4 which is the size of the smallest coding unit is determined as a minimum size of the luma block, and splitting may be performed. In chroma components U and V, because the size of the chroma block is ½ of the pixel of the picture, 8 which is twice the size of the smallest coding unit is determined as a minimum size of the chroma block, and splitting may be performed. In detail, when the size of the smallest coding unit is signaled in units of $\log_2$ and a value obtained therefrom is 2, the luma block may be split based on 2, and the chroma block may be split based on 3 (a value obtained by adding 1 to the value obtained by the signaling).

Also, regardless of sub-sampling, when the size of the smallest coding unit is 4, splitting may be performed for both the luma component and the chroma component by setting the minimum block size to 4.

According to another embodiment, in context modeling of chroma block splitting, split information of the luma block may be used. In detail, a context model may vary depending on the number of sub-coding units that a luma block corresponding to a current chroma block is configured with. For example, context modeling may be performed by distinguishing a case where the number of sub-coding units is 4 or more and a case where the number of sub-coding units is less than 4.

According to an embodiment, a quadtree, binary tree, and triple tree structure may be applied differently depending on a size or ratio of a block.

For example, when a width-to-height ratio of the block is greater than a specific ratio, a specific tree structure may not be applied. In detail, when the ratio of the block is greater than 1:N (where N is an integer greater than or equal to 1), an affine mode, decoder side motion vector refinement (DMVR), a mode for deriving a prediction mode from the decoding side, position dependent intra prediction (PDPC), an LM chroma mode, multiple transform selection, adaptive motion vector resolution (AMVR), a method of separately splitting a luma block and a chroma block in an inter slice, or prediction in units of sub-blocks may not be used.

As another example, when the size of the block is greater than M×N, a specific mode may not be applied. In detail, when the size of the block is greater than 32×32, an intra mode may not be applied.

As another example, when a length of one side (width or height) of the block is equal to or less than a specific length, a specific mode may not be applied. In detail, when the length of one side of the block is equal to a minimum coding unit size (e.g., 4), the prediction in units of sub-blocks may not be performed, and when the length of one side of the block is equal to or less than a size of a sub-block, the prediction in units of sub-blocks may not be performed.

As another example, when the length of one side of the block is equal to or less than a specific length, in multiple transform selection in which one of a plurality of transform types in horizontal and vertical directions is selected during transformation, a fixed transform type may be determined as a transform type for a corresponding direction. In this case, because there is only one transform type, explicit signaling may be omitted. The fixed transform type may be determined from among DCT2 or DCT2 like transform, or DST7 or DST7 like transform.

Figure 28A:
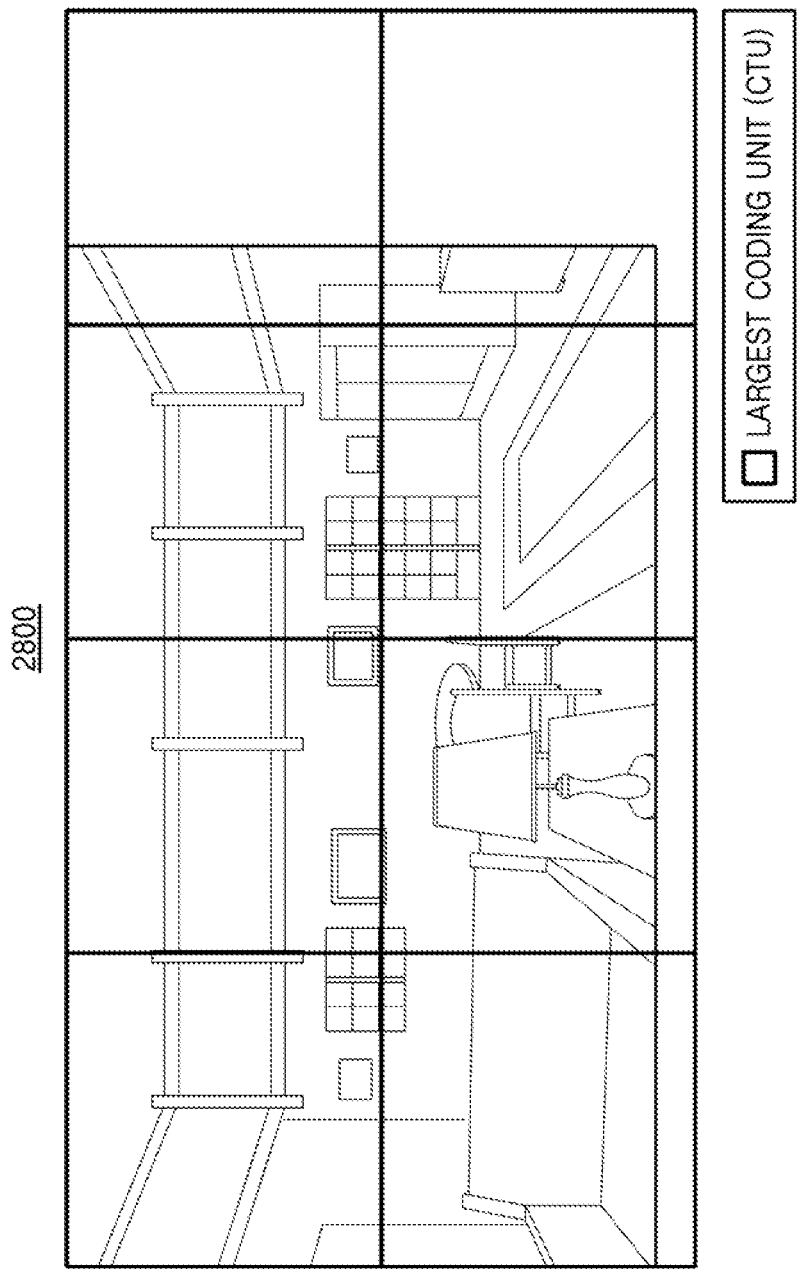
FIG. 28A illustrates a largest coding unit at a boundary of a picture.
Figure 28B:
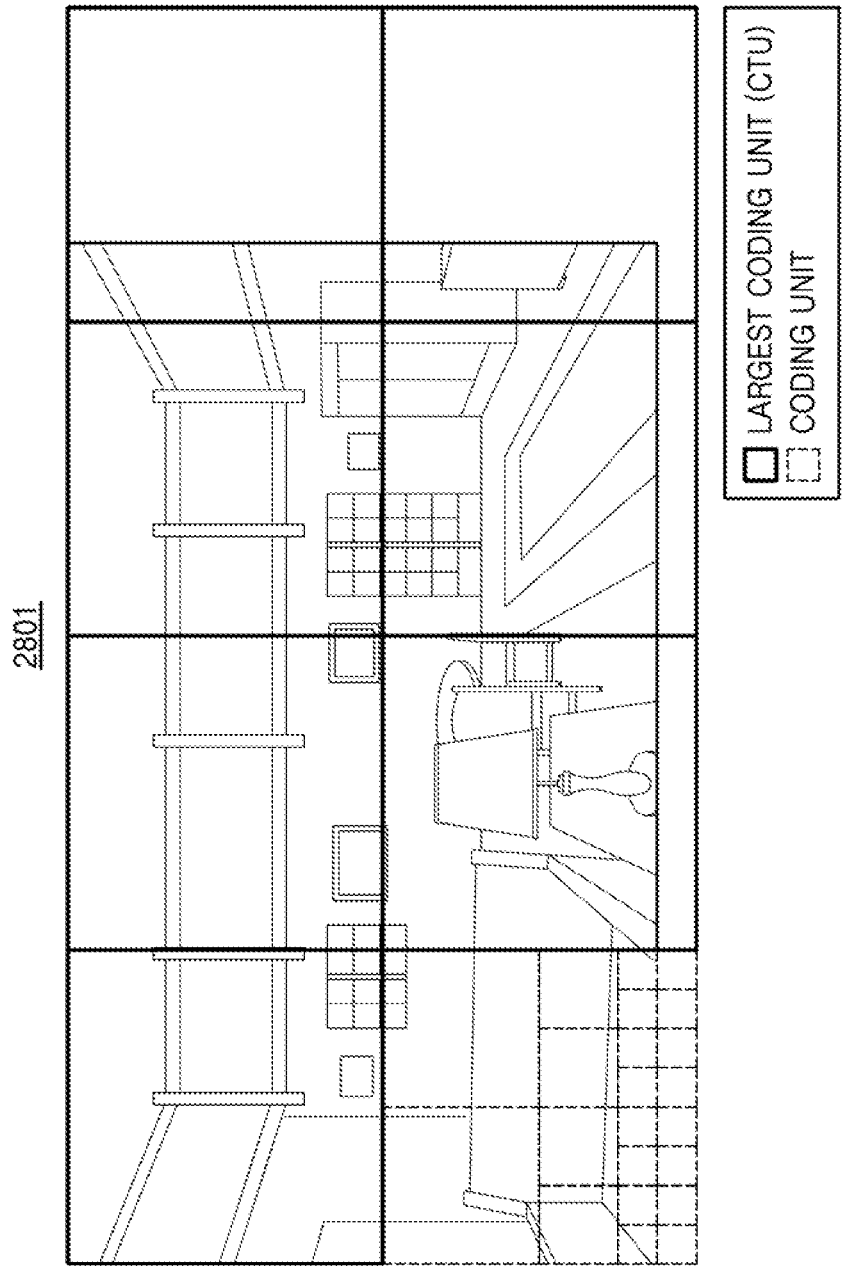
FIG. 28B illustrates a method of splitting a block until a coding unit that is not across a boundary of a picture is obtained.

FIG. 28A illustrates a largest coding unit at a boundary of a picture, and FIG. 28B illustrates a method of splitting a block until a coding unit that is not across a boundary of a picture is obtained.

Referring to FIG. 28A, a size of a boundary region of the picture may be different from a size of a largest coding unit (coding tree unit (CTU)). That is, the largest coding unit (CTU) and the picture may not be aligned. In this case, as shown in FIG. 28B, the largest coding unit (CTU) is split into coding units.

Referring to FIG. 28B, in HEVC, a largest coding unit (CTU) across a boundary of a picture is quadtree split until a coding unit that is not across the boundary of the picture is obtained. Thereafter, coding units that are not across the picture may be encoded, and coding units that are outside the picture may not be encoded.

In addition to the quadtree split, when various types of split methods such as binary tree and triple tree splits are used, various methods of splitting a largest coding unit (CTU) at a boundary of a picture may also be used.

According to an embodiment, the binary tree and triple tree structures may be applied to blocks having a specific size or less. For example, only the quadtree structure may be allowed for blocks having a size of 128×128 (or 64×64) or greater, and the binary tree and triple tree structures may be allowed only for blocks having a size of 64×64 (or 32×32) or less. A maximum size of the block for which the binary tree and triple tree structures are allowed may be determined based on signaled information about the maximum size. That is, based on the signaled information, the binary tree and triple tree structures may be allowed from the same level or depth.

According to an embodiment, a coding mode may be applied differently depending on a size of a coding unit at the boundary of the picture. Prediction or residual coding may be performed according to the size of the coding unit. For example, when the size of the coding unit is large, a probability that a predicted image matches an image of a current block is high, and thus a mode for transmission without residual data may be selected for blocks having a large size, and when the size of the coding unit is small, the image is more likely to be complex as the size of the coding unit is smaller, and thus the coding unit may be further split without signaling a flag, instead of not transmitting the residual data.

Figure 29:
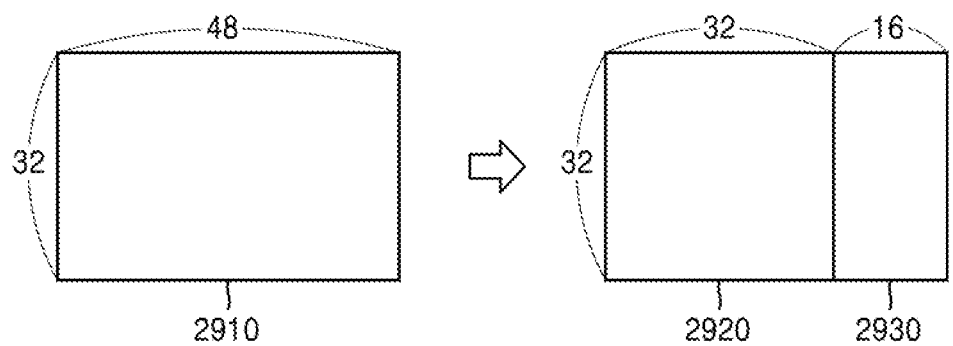
FIG. 29 illustrates a diagram for describing prediction and transformation on a rectangular block located at a boundary of a picture.

FIG. 29 illustrates a diagram for describing prediction and transformation on a rectangular block located at a boundary of a picture.

Referring to FIG. 29, according to an embodiment, when a size of the block located at the boundary of the picture is not powers of 2, for example, when the block is a 48×32-sized block 2910, only the mode for transmission without residual data (skip mode, cbf=0, etc.) may be selected. Also, sizes of a prediction unit and a transform unit may be different from each other. For example, in order to transform the 48×32-sized block 2910, the 48×32-sized block 2910 may be split into a 32×32-sized block 2920 and a 16×32-sized block 2930 without signaling a flag.

According to another embodiment, when the size of the block located at the boundary of the picture is not powers of 2, for example, when the block is the 48×32-sized block 2910, the 48×32-sized block 2910 may be split without signaling a flag so that the size of the 48×32-sized block 2910 is powers of 2. In this case, the sizes of the prediction unit and the transform unit are the same as each other.

According to another embodiment, when a size of a block located at a boundary of a picture having a specific size, for example, a size of 64×64, or greater is not powers of 2, the mode for transmission without residual data may be selected, and when a size of a block located at a boundary of a picture having a size of less than 64×64 is not powers of 2, the block may be split without signaling a flag so that the size of the block is powers of 2.

According to another embodiment, whether to allow residual coding unconditionally may be determined based on the size of the coding unit located at the boundary of the picture. For example, it may be set so that, when the size of the coding unit is 64×64 or greater, the residual coding is not performed, and when the size of the coding unit is less than 64×64, the residual coding is performed.

According to another embodiment, when both the quadtree structure and the binary tree structure are used to split the coding unit located at the boundary of the picture, a flag distinguishing the quadtree structure and the binary tree structure from one another may be signaled. In this case, a resolution of the picture may be considered. In detail, when the binary tree structure is selected by the flag and the coding unit is split by a maximum depth of the binary tree structure, but a resolution is not suitable for the resolution of the picture, the binary tree structure may be restricted from being selected. Therefore, because signaling for the binary tree structure is not required to be considered, when only the quadtree and binary tree structures are selected by the flag, the quadtree structure may be selected without separate signaling.

According to another embodiment, when the coding unit is located at a boundary of a lower-right corner of the picture, the coding unit may be split only into the binary tree structure. In detail, the coding unit may include only a square block and a rectangular block having a width-to-height ratio of 1:2 or 2:1. For example, when an M×M square block is first binary tree split in a horizontal direction and two split M×M/2 rectangular blocks are placed at the boundary of the picture, a binary tree split may be further performed in a vertical direction. On the other hand, when the binary tree split is first performed in the vertical direction, the split blocks may be further split in the horizontal direction.

Figure 30:
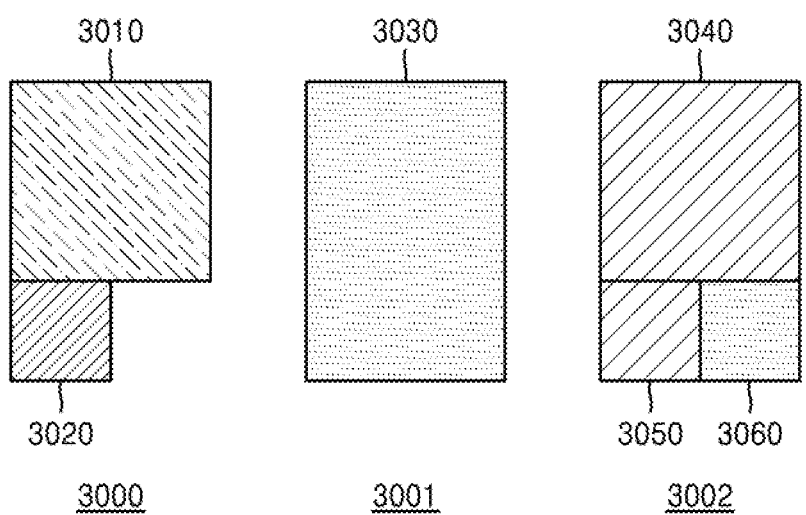
FIG. 30 illustrates a diagram for describing a method of performing motion compensation with an adjacent block when only a skip mode is allowed for a block of a specific size, according to an embodiment.

FIG. 30 illustrates a diagram for describing a method of performing motion compensation with an adjacent block when only a skip mode is allowed for a block of a specific size, according to an embodiment.

Referring to FIG. 30, for a 4×4-sized block, only the skip mode is allowed and motion compensation is performed together with an adjacent block, and thus a memory bandwidth may be reduced. In detail, when a size of a current block 3020 of a current picture 3000 is 4×4, a size of an upper adjacent block 3010 is 8×8, and the current block 3020 is in a skip mode using motion information of the upper adjacent block 3010, motion compensation may be performed on an 8×12-sized block 3001 including the 8×8-sized upper adjacent block 3010 and the 4×4-sized current block 3020. A result of performing the motion compensation may be used as a reference block 3002. The reference block 3002 may include an upper adjacent reference block 3040 corresponding to the upper adjacent block 3010, a current reference block 3050 corresponding to the current block 3020, and a right adjacent reference block 3060. Also, in this case, the current block 3020 may derive a skip mode candidate (or merge mode candidate) only from blocks located in the left side and the upper side. This is because the motion compensation has been performed under the assumption that the right adjacent reference block 3060 located in the right side is not in the skip mode.

Figure 31A:
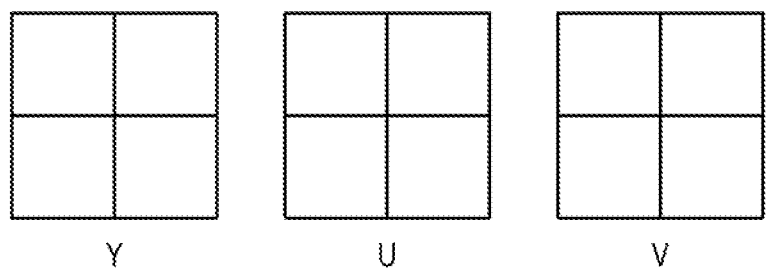
FIG. 31A illustrates a luma block and a chroma block in a 4:4:4 YUV color format.
Figure 31B:
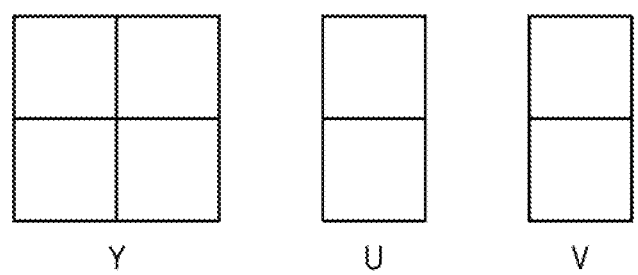
FIG. 31B illustrates a luma block and a chroma block in a 4:2:2 YUV color format.
Figure 31C:
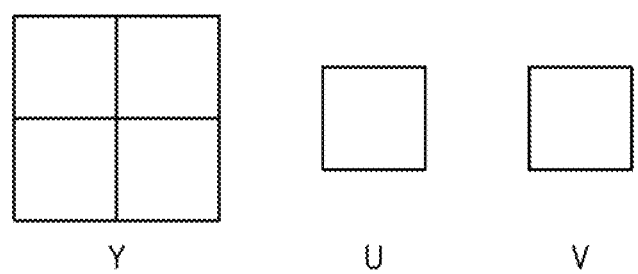
FIG. 31C illustrates a luma block and a chroma block in a 4:2:0 YUV color format.

FIG. 31A illustrates a luma block and a chroma block in a 4:4:4 YUV color format, FIG. 31B illustrates a luma block and a chroma block in a 4:2:2 YUV color format, and FIG. 31C illustrates a luma block and a chroma block in a 4:2:0 YUV color format.

Referring to FIG. 31A, a luma block and a chroma block have blocks of the same size and shape. Referring to FIG. 31B, a chroma block has a ratio of ½ of a luma block. Referring to FIG. 3, a luma block and a chroma block have blocks of the same shape.

In the 4:2:2 YUV color format of FIG. 31B, the chroma block, which is ½ of the luma block, supports only a square block (with a ratio of 1:1) in a quadtree structure in the existing HEVC, and thus the chroma block is split into square blocks and then processed. However, by using the binary tree structure or the triple tree structure in addition to the quadtree structure, blocks with various ratios such as 1:2, 1:4, etc. may be processed. Accordingly, even in the 4:2:2 YUV color format, there is no need to process the luma block and the chroma block differently. That is, the chroma block may be changelessly processed, without the need to split the chroma block into square shapes and process the split blocks.

According to an embodiment, when performing transformation on a chroma block in a 4:2:2 YUV color format for an M×N luma block, rectangular transformation may be performed on an M/2×N or M×N/2 chroma block.

According to an embodiment, when performing transformation on the chroma block in the 4:2:2 YUV color format for the M×N luma block, transformation may be respectively performed on two M/2×N/2 chroma blocks.

According to another embodiment, when performing transformation on the chroma block in the 4:2:2 YUV color format for the M×N luma block, within a chroma block range of 2×2 to 32×32, at a specific size, rectangular transformation may be performed on an M/2×N or M×N/2 chroma block, and in other cases, transformation may be respectively performed on two M/2×N/2 chroma blocks.

According to another embodiment, fora 128×64 or 64×128-sized chroma block, transformation may be performed on two 64×64-sized chroma blocks.

According to another embodiment, a 2:1 or 1:2 Hadamard transform may be performed on a 128×64 or 64×128-sized chroma block, and then one 64×64 transformation may be performed thereon.

According to another embodiment, a restriction may be placed on splitting so that a 128×64 or 64×128-sized chroma block is not generated.

According to another embodiment, two 64×2 or 2×64 transformations may be performed on a 128×2 or 2×128-sized chroma block.

According to another embodiment, two 64×1 or 1×64 transformations may be performed on a 128×2 or 2×128-sized chroma block. That is, transformation in one direction may be performed.

According to another embodiment, a restriction may be placed on splitting so that a 128×2 or 2×128 chroma block is not generated.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the afore-described embodiments of the disclosure may be written as a program executable on a computer, and may be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method comprising:
obtaining, from a bitstream, information about an intra prediction mode of a top-left sample in a current chroma block;
obtaining an intra prediction mode of a sample at a bottom-right location in a current luma block corresponding to the current chroma block, wherein the current luma block is split into at least two lower luma blocks including a lower luma block comprising the sample at the bottom-right location;
determining an intra prediction mode of the top-left sample of the current chroma block using the intra prediction mode of the sample at the bottom-right location and the information; and
performing intra prediction on the current chroma block using the intra prediction mode of the top-left sample of the current chroma block,
wherein the sample at the bottom-right location is a sample at a location of ½ of a width of the current luma block in a right direction from a location of a top-left sample in the current luma block and ½ of a height of the current luma block in a lower direction from the location of the top-left sample in the current luma block.

* * * * *